(12) United States Patent
Koguchi et al.

(10) Patent No.: US 10,910,971 B2
(45) Date of Patent: Feb. 2, 2021

(54) ALTERNATOR CONTROL UNIT, ALTERNATOR DRIVING CONTROL METHOD, AND POWER SUPPLY MANAGEMENT SYSTEM FOR ENGINE VEHICLE

(71) Applicant: Calsonic Kansei Corporation, Saitama (JP)

(72) Inventors: Atsuhiro Koguchi, Saitama (JP);
Toshinori Yagi, Saitama (JP);
Katsunori Oshiage, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 556 days.

(21) Appl. No.: 15/566,111

(22) PCT Filed: Apr. 14, 2016

(86) PCT No.: PCT/JP2016/062031
§ 371 (c)(1),
(2) Date: Oct. 12, 2017

(87) PCT Pub. No.: WO2016/167324
PCT Pub. Date: Oct. 20, 2016

(65) Prior Publication Data
US 2018/0091076 A1    Mar. 29, 2018

(30) Foreign Application Priority Data
Apr. 14, 2015 (JP) .................................. 2015-082493

(51) Int. Cl.
*H02P 9/00* (2006.01)
*F02D 29/06* (2006.01)
*H02J 7/00* (2006.01)

(52) U.S. Cl.
CPC .............. *H02P 9/008* (2013.01); *F02D 29/06* (2013.01); *H02J 7/00* (2013.01); *Y02T 10/70* (2013.01)

(58) Field of Classification Search
CPC .......... H02P 9/008; F02D 29/05; F02D 29/06; H02J 7/00; H02J 7/1446; Y02T 10/7005
See application file for complete search history.

(56) References Cited

U.S. PATENT DOCUMENTS

| 2008/0093851 | A1 | 4/2008 | Maeda et al. |
| 2016/0090001 | A1* | 3/2016 | Nomoto .................... B60L 7/18 320/109 |

FOREIGN PATENT DOCUMENTS

| CN | 101222150 | 7/2008 |
| CN | 101837776 | 9/2010 |

(Continued)

OTHER PUBLICATIONS

Office Action issued for Chinese Patent Application No. 201680021829.7, dated Oct. 12, 2019, 24 pages including English translation (translation is obtained from the Global Dossier of EPO).

(Continued)

Primary Examiner — Rodney A Butler
(74) Attorney, Agent, or Firm — Hamre, Schumann, Mueller & Larson, P.C.

(57) ABSTRACT

Problem
To maintain high fuel consumption performance also in the charging by a drive of an alternator at the non-deceleration in a power source management system that drives the alternator during vehicle deceleration to charge a battery.
Solution
A power generation cost of an alternator is found from a rotational speed and torque of an engine at the non-deceleration. The alternator is driven only when an SOC of a battery is in a drive permission zone Z in which, based upon (Continued)

the power generation cost, the SOC and the power consumption, the SOC is the lower as the power generation cost is the higher and the SOC is the higher as the power consumption is the higher. The fuel consumption performance is higher as compared to a conventional example of always driving the alternator when the SOC is equal to or less than a maximum upper limit value SOCm regardless of the power generation cost as an index of an engine efficiency.

13 Claims, 14 Drawing Sheets

(56) References Cited

FOREIGN PATENT DOCUMENTS

| | | |
|---|---|---|
| JP | 2001211507 | 8/2001 |
| JP | 2007116766 | 5/2007 |
| JP | 2010104123 | 5/2010 |
| JP | 2012117402 | 6/2012 |
| JP | 2012200095 | 10/2012 |
| JP | 2013194707 | 9/2013 |
| JP | 201414132 | 8/2015 |
| WO | 2014099354 | 6/2014 |

OTHER PUBLICATIONS

International Search Report issued in International Application No. PCT/JP2016/062031 dated Jun. 6, 2016 (4 pages).
Written Opinion issued in International Application No. PCT/JP2016/062031 dated Jun. 6, 2016 (4 pages).

* cited by examiner

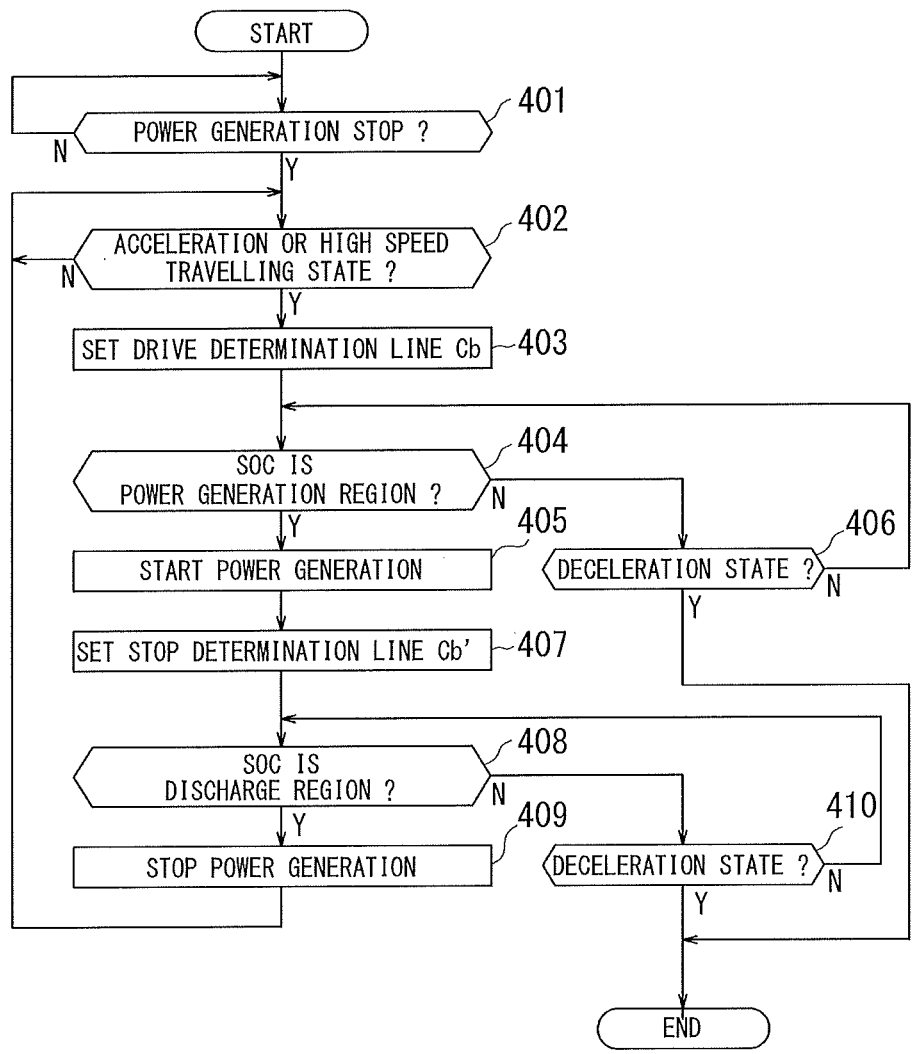

ALTERNATOR CONTROL UNIT, ALTERNATOR DRIVING CONTROL METHOD, AND POWER SUPPLY MANAGEMENT SYSTEM FOR ENGINE VEHICLE

TECHNICAL FIELD

This invention relates to a power source management system in a vehicle that charges a battery by generated power of an alternator.

REREVANT ART

In recent years, there have been proposed various kinds of power source management systems for a vehicles that have adopted a technology, called as a Micro HEV. In this technology, a battery is charged by generated power of the alternator which is driven by regenerative energy at the vehicle deceleration.

In the power source management system that has adopted this technology, the alternator is driven at the deceleration of a vehicle and is not driven by an engine all the time. Thus, an improvement on fuel consumption performance by a decrease in engine loads has been achieved.

Patent Document 1 discloses a combination of this technology and an idling stop technology in which In this idling stop technology, an engine stops automatically during the temporary stopping of a vehicle at an intersection and the like.

However, it is necessary to drive a starter motor of the engine, when restarting the engine that has stopped by the idling stop. There possibly occurs a case where a battery cannot supply necessary power only by the charging of the generated power by the regenerative energy, depending upon a power consumption state including consumption by other in-vehicle devices.

Therefore, in Patent Document 1, the alternator is configured to be driven by a driving force of the engine according to a decrease, state of an SOC (charging rate) of the battery even at other than the deceleration time of the vehicle.

REREVANT ART DOCUMENT

Patent Document

Patent Document 1: Japanese Patent Laid-Open No. 2014-137002 A

SUMMARY OF THE INVENTION

Problem to Solution

In Patent Document 1, timing of driving the alternator for charging the battery is determined based upon only the SOC of the battery, when the vehicle is non-deceleration state. So, there occurs a case, where a part of engine output have to be consumed for the drive of the alternator even when an engine efficiency is low.

In this case, an influence on travelling performance occurs, and an improvement on fuel consumption performance as an original purpose is possibly fixed to a certain level, showing a room for further improvement.

Therefore in the engine vehicle in which the battery is charged by the generated power of the alternator, it is desired to further improve the fuel consumption performance.

Solution to Problem

Therefore the present invention provides a control unit for an alternator in an engine vehicle that charges a battery by generated power of the alternator, the control unit being configured to, in a case where the engine vehicle is during deceleration, determine whether to perform a drive of the alternator based upon an SOC of the battery, in a case where the engine vehicle is not during deceleration, determine whether to perform the drive of the alternator based upon an engine efficiency and the SOC of the battery, and drive or stop the alternator in response to the determination on whether to perform the drive of the alternator.

Advantageous Effect of The Invention

According to the present invention, when the vehicle is during deceleration, power is generated by driving the alternator until reaching a predetermined SOC and the battery is charged by the generated power. Thereby, a time of driving the alternator in a state where the engine efficiency is low to be decreased. When the vehicle is not during deceleration, driving of the alternator is determined by considering not only the SOC but also the engine efficiency. Thereby, it is possible to suppress the drive of the alternator in a state where the engine efficiency is low.

BRIEF DESCRIPTION OF THE DRAWINGS

FIG. 18 is a flow chart explaining the drive process of the alternator using the two determination lines.

DESCRIPTION OF EMBODIMENTS

Hereinafter, an explanation will be made of the present invention by taking a case of being incorporated in an engine control device 1 as an example.

Figure 1:
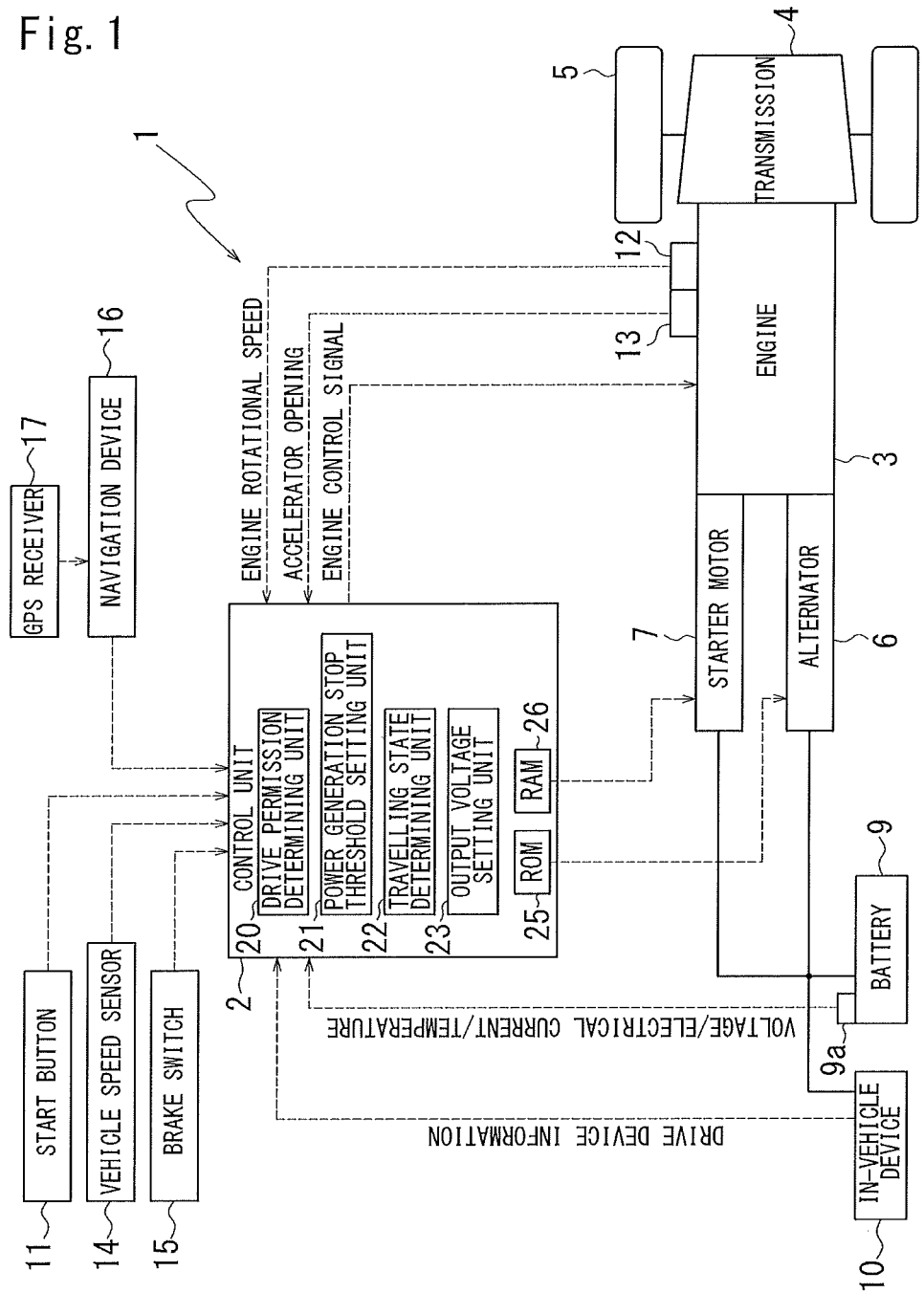
FIG. 1 is a block diagram illustrating an embodiment of the present invention.

FIG. 1 is a block diagram illustrating the engine control device 1.

A control unit 2 in the engine control device 1 outputs an engine control signal for defining an injection quantity of fuel to an engine 3. The engine control signal is given based upon a signal indicative of an engine rotational speed that is input from a rotation sensor 12 attached to the engine 3 and a signal indicative of an accelerator opening that is input from an accelerator sensor 13.

A start button 11 forming an ignition switch, a vehicle speed sensor 14, a brake switch 15 and a navigation device 16 are connected to the control unit 2.

The vehicle speed sensor 14 outputs a vehicle speed signal indicative of a speed of a vehicle to the control unit 2. The brake switch 15 outputs a signal whether or not a brake pedal (unillustrated) is stepped on to the control unit 2.

The navigation device 16 identifies a position of an own vehicle from a GPS signal that is input from a GPS receiver 17. The navigation device 16 acquires information necessary for navigation of its own vehicle, such as traffic jam information from an external server (unillustrated) connected via a telecommunication line (unillustrated). Then the navigation device 16 provides the information relating to the travelling of its own vehicle.

The control unit 2, when the start button 11 switches on, generates a start-up signal of the engine 3 to be outputted to a starter motor 7. The engine is provided with an alternator 6 and the starter motor 7 for start-up, and an output rotation of the engine 3 is input to wheels 5 through a transmission 4 to drive the wheels 5 for rotation.

The starter motor 7 is connected to a battery 9. The starter motor 7, when start button 11 is pushed, drives the engine 3 for rotation, based upon a start-up signal that is input from the control unit 2.

The alternator 6 is an AC generator jointed to a rotational shaft of the engine 3, has a converter circuit to a direct current, and is connected to the battery 9.

The alternator 6, when a field current is in a power supply state, generates power with rotation to charge the battery 9. When the field current is cut off, the power generation is not outputted, putting the alternator 6 to be idle away.

In the present embodiment, to put the alternator to be in the power supply state of the field current by a drive signal from the control unit 2 is indicative of driving the alternator.

Various kinds of in-vehicle devices 10 as loads are connected to the battery 9, and a power supply can be made to the in-vehicle devices 10 from the battery 9 and the alternator 5 during the power generating.

The in-vehicle devices 10 include engine auxiliary machines, a transmission control device and the like. In the present embodiment, information indicating on which in-vehicle device out of many of the in-vehicle devices 10 is driving is input to the control unit 2. That is, the information (drive device information) indicative of to which in-vehicle device the power is supplied is input to the control unit 2.

A battery sensor 9a is attached to the battery 9, and the battery sensor 9a outputs a battery state signal to the control unit 2. The battery state signal is used upon finding an SOC (charging rate) of the battery 9.

Here, various kinds of methods are present for accurate estimation of the SOC. In the present embodiment, terminal voltages, currents and temperatures are used as the battery state signals.

The control unit 2 basically controls the engine 3 based upon an accelerator opening and an engine rotational speed. The accelerator opening is identified from a signal that is input from the accelerator sensor 13. The engine rotational speed is identified from a signal that is input from the rotation sensor 12.

Further, the control unit 2 is configured to perform an idle stop control of the engine 3 when a predetermined idle stop permission condition is established.

That is, when a speed of a vehicle is zero (the vehicle is being stopped) and the brake pedal (unillustrated) is being stepped on, the control unit 2 stops the engine 3 to be in an idle stop state. The speed of a vehicle is identified from a vehicle speed signal that is input from the vehicle speed sensor 14. Whether or not the brake pedal (unillustrated) is being stepped on is identified from a signal that is input from the brake switch 15.

In addition, when the engine 3 is in the idle stop state, the control unit 2 outputs a start-up signal of the engine 3 if following requirements are established. That is, if the release of the brake pedal (unillustrated) is identified from a signal that is input from the brake switch 15, and the stepped on of the accelerator pedal is identified from a signal that is input from the accelerator sensor 13.

Thereby, when the starter motor 7 receives the start-up signal of the engine 3, the engine 3 is automatically restarted. It should be noted that the restart of the engine 3 in this case is performed without reference to presence/absence of an operation of the start button 11.

First Embodiment Relating to a Drive Control of the Alternator 6

Next, an explanation will be made of a drive control of the alternator 6 by the control unit 2.

The control unit 2 is provided with a drive, permission determining unit 20. The drive permission determining unit 20 determines whether to perform a drive of the alternator 6 based upon a traveling state (deceleration or not) of a vehicle, an SOC of the battery 9, an engine efficiency, a load (power consumption) state and the like.

Figure 3:
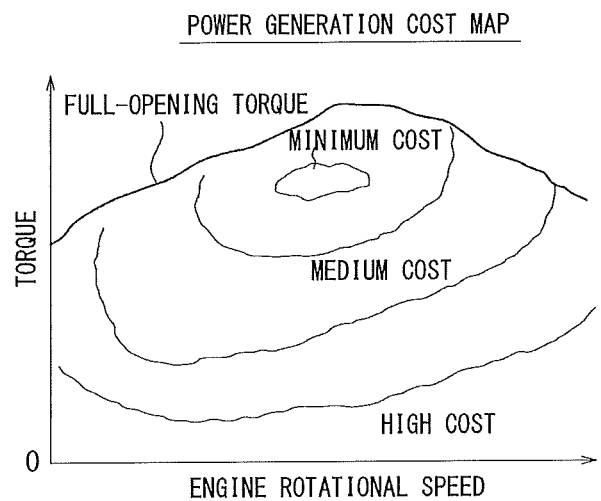
FIG. 3 is a graph illustrating a power generation cost map.

Here, the control unit 2 uses, as an index of the engine, efficiency, a power generation cost map M1 (refer to FIG. 3) stored in a ROM 25.

The power generation cost map M1 defines a power generation cost (yen/KWh) of the alternator 6 to an engine rotational speed and torque outputted from the engine 3, based upon a fuel consumption quantity.

As a general trend, the cost is relatively lower in a medium speed region in the vehicle driving speed than in the other regions (high speed region and low speed region) In addition, the map M1 indicates that in the same engine rotational speed, as the torque is the higher, the power generation cost is the lower, and as the power generation cost is the lower, the engine efficiency is the higher.

Power consumption data at the driving of each of the in-vehicle devices 10 are stored in the ROM 25.

Figure 2:
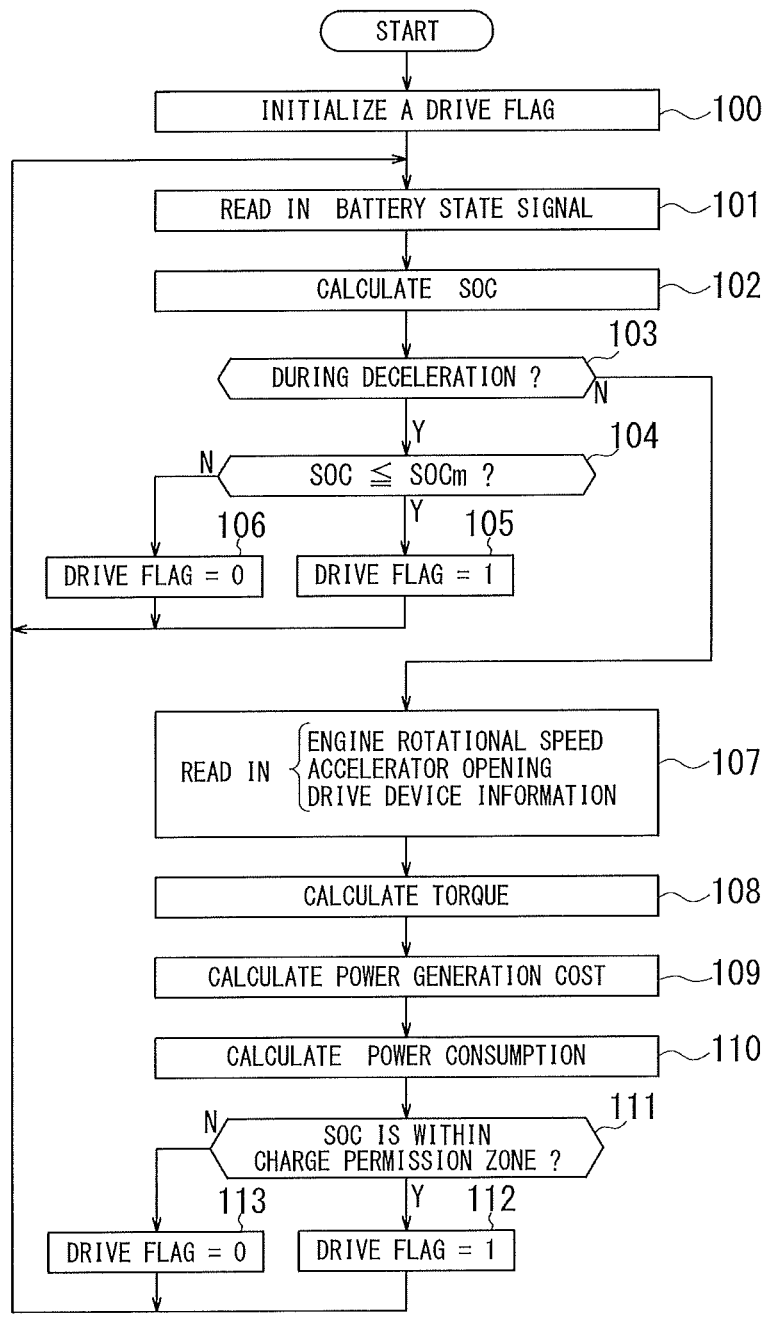
FIG. 2 is a flow chart illustrating a flow of a drive control of an alternator.

FIG. 2 is a flow chart illustrating a flow of the drive control of the alternator 6 by the drive permission determining unit 20 in the control unit 2.

The drive control of the alternator 5 starts immediately after the start button 11 is pushed to start the engine 3.

It should be noted that the data read or calculated in each step are to be stored in a RAM 26 in a working memory each time.

First, at step 100 the drive permission determining unit 20 resets a drive flag, and resets the other data in the RAM 26 as well.

At step 101 the drive permission determining unit 20 reads in battery state signals (a terminal voltage, a current and a temperature) from the battery sensor 9a. At step 102 the drive permission determining unit 20 estimates/calculates an SOC based upon the read battery state signals.

At step 103 the drive permission determining unit 20 confirms whether or not a vehicle is during deceleration. Here, whether the vehicle is during deceleration can be determined based upon whether or not the fuel injection quantity identified from a control signal, output to the engine 3 is zero (−0). In a case where the fuel injection quantity is zero (−0), the vehicle is determined to be during deceleration.

When the vehicle is during deceleration (Yes at step 103), the process transfers to step 104, and when the vehicle is not during deceleration (No at step 103), the process transfers to step 107.

At step 104 the drive permission determining unit 20 confirms whether or not the SOC is equal to or less than a maximum upper limit value SOCm preliminarily determined for avoiding overcharge.

When the SOC is equal to or less than the maximum upper limit value SOCm (Yes at step 104), the process transfers to step 105, and when the SOC goes beyond the maximum upper limit value SOCm (No at step 104), the process transfers to step 106.

At step 105 the drive permission determining unit 20 sets the drive flag in a case where the drive flag is not set, and thereafter, the process returns to step 101. In a case where the drive flag is set, the process returns to step 101 while keeping the drive flag set.

On the other hand, at step 106 the drive permission determining unit 20 resets the drive flag in a case where the drive flag is set, and thereafter, the process returns to step 101. In a state where the drive flag is not set, the process returns to step 101 in that state.

Here, the control unit 2, when the drive flag is set, sets the alternator 6 to be in a driving state, and when the drive flag is not set, sets the alternator 6 to be in a non-driving state.

Therefore the alternator 6, while the drive flag is being set, is driven by the control unit 2 to generate power and supplies the power to the battery 9 and the in-vehicle device 10.

Accordingly, when the vehicle is during deceleration and the SOC is equal to or less than the maximum upper limit value SOCm, the power is supplied to the battery 9 and the in-vehicle device 10 from the alternator 6.

On the other hand, when the vehicle is not during deceleration (No at step 103), at step 107 the drive permission determining unit 20 performs the reading-in of an engine rotational speed, an accelerator opening, and the drive device information. The engine rotational speed is identified from an output signal of the rotation sensor 12. The accelerator opening is identified from an output signal of the accelerator sensor 13. The drive device information is obtained from the RAM 26.

Here, "the drive device information" is information indicative of which in-vehicle device 10 out of the plurality of in-vehicle devices 10 to be driven by the power supplied from the battery 9 is driven.

At step 108 the drive permission deters ling unit 20 calculates torque of the engine 3 based upon the engine rotational speed and the accelerator opening. At subsequent step 109 the drive permission determining unit 20 refers to the power generation cost map M1 based upon the engine rotational speed and the torque, and finds a power generation cost on the power generation cost map M1.

At step 110 the drive permission determining unit 20 refers to the drive device information stored in the RAM 26 to identify which in-vehicle device 10 out of the plurality of in-vehicle devices 10 is driving. In addition, the drive permission determining unit 20 refers to power consumption data of the respective in-vehicle devices 10 stored in the ROM 25 to calculate a total quantity of the respective power consumptions of the driving in-vehicle devices 10.

At step 111 the drive permission determining unit 20 refers to a drive permission zone map M2 based upon the power generation cost found at step 108 and the power consumption found at step 110. Then, drive permission determining unit 20 confirms whether or not the SOC (charging rate) of the battery 9 is being within a drive permission zone (power generation region) in the drive permission zone map M2.

Figure 4:
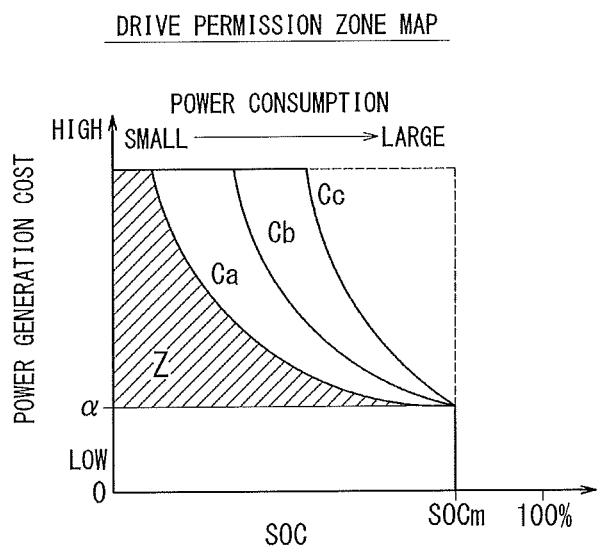
FIG. 4 is a graph illustrating a drive permission zone map.

FIG. 4 is a graph explaining the drive permission zone map M2. In this figure, a lateral axis indicates an SOC (charging rate) and a longitudinal axis indicates a power generation cost, wherein a boundary line (drive permission upper limit line C) for determining whether to perform a drive of the alternator 6 is set.

Therefore by referring to the drive permission zone map M2 based upon the SOC (charging rate) of the battery 9 and confirming that the SOC is being in one side (left lower side in the figure) or the other side (right upper side in the figure) of the boundary line, whether to perform the drive of the alternator 6 can be determined.

In the present embodiment, in a region where the power generation cost is equal to or more than a predetermined value α, a plurality of drive permission upper limit lines C (Ca, Cb, Cc) are set corresponding to the total power consumption of the driving in-vehicle devices 10. The total power consumption of the driving in-vehicle devices 10 is considered in addition to the SOC when determining whether to perform the drive of the alternator 6.

Here, the drive permission upper limit lines C (Ca, Cb, Cc) are set such that in the region where the power generation cost is equal to or more than the predetermined value α, as the power generation cost increases (the engine efficiency is decreased) from the maximum upper limit value SOCm as a starting point, a threshold (threshold SOC) for determining the drive of the alternator 6 is decreased.

For example, in a case where the power generation cost is "small", a region indicated by hatching in the figure corresponds to a drive permission zone Z permitting the drive of the alternator 6, and in a case where the SOC is positioned within this drive permission zone Z, the drive of the alternator 6 is permitted.

In the present embodiment, in the plurality of drive permission upper limit lines C (Ca, Cb, Cc) set corresponding to the total power consumption, as the power consumption is the larger, a decrease degree of the SOC to an increase in power generation costs is the more gradual.

Accordingly, the SOC when the power generation cost is the maximum in the drive permission upper limit line Cc at the time the power consumption is "large" is higher than the SOC when the power generation cost is the maximum in the drive permission upper limit line Ca at the time the power consumption is "small".

It should be noted that the inside of a region surrounded by a broken line in FIG. 4 indicates for reference a range of a conventional drive permission zone permitting the drive of the alternator. In the case of the conventional drive permission zone, the drive of the alternator is allowed regardless of the power generation cost (engine efficiency) as long as the SOC is equal to or less than the maximum upper limit value SOCm.

Back to the explanation of the flow chart in FIG. 2, in the above-mentioned step 111, in a case where the SOC (charging rate) of the battery 9 is positioned within the drive permission zone Z (Yes at step 111), the process transfers to step 112. In addition, at step 112 the drive permission determining unit 20 sets the drive flag in a case where the drive flag is not set, and thereafter, the process returns to step 101. In a case where the drive flag is set, the process returns to step 101 while keeping the state where the drive flag is being set.

On the other hand, in the above-mentioned step 111, in a case where the SOC (charging rate) of the battery 9 is not positioned within the drive permission zone Z (No at step 111), the process transfers to step 113.

In addition, at step 113 the drive permission determining unit 20 resets (clears) the drive flag in a case where the drive flag is set, and thereafter, the process returns to step 101.

In a case where the drive flag is not set, the process returns to step 101 while keeping the state where the drive flag is not set.

Accordingly in a case where the vehicle is not during deceleration (No at step 103), the alternator 6 is driven on a condition that the SOC (charging rate) of the battery 9 is positioned within the drive permission zone Z in the drive permission zone map M2. Thereby, power of a regular voltage (15V) generated in the alternator 5 is supplied to the battery 9 and the in-vehicle device 10.

By the above control, during the deceleration where engine output is not necessary, the alternator 6 is driven by a reverse driving force from the wheel 5-side through the transmission 4 and the engine 3. That is, the alternator 6 is driven by regenerative energy to charge the battery 9 in a range of not going beyond the maximum upper limit value SOCm for avoiding overcharge.

When the vehicle is not during deceleration, the drive is permitted even if the SOC is relatively high in a state where the engine efficiency is high (the power generation cost is low). But the drive is not permitted until the SOC is remarkably low in a state where the engine efficiency is low (the power generation cost is high). Therefore, when the engine efficiency is low and the fuel consumption is bad, the engine output is not consumed by the drive of the alternator 6.

On the other hand, in a case where the SOC is excessively low, there occurs a possibility that the battery 9 is overcharged. In this case even if the engine efficiency is low, the alternator 6 is driven to charge the battery 9.

In addition, an SOC upper limit (drive permission upper limit line C) in which the drive of the alternator 6 is permitted varies with power consumption by the in-vehicle device 10. For example, when the power consumption is large, since the drive is started early because of a high SOC upper limit, there is no possibility that the charge does not catch up with the discharge of the battery 9.

In the present embodiment, the engine control device 1 corresponds to a power source management system in the present invention, and the power generation cost of the alternator 6 corresponds to the engine efficiency.

In addition, the in-vehicle device 10 corresponds to a battery load.

The present embodiment has been disclosed a power source management system having a following configuration.

(1) A power source management system in an engine vehicle (vehicle) comprises the alternator 6 that generates power by a driving force or regenerative power of the engine 3;

the battery 9 to be charged with the generated power of the alternator 6; and the control unit 2 configured to control a drive or a stop of the alternator 6.

The control unit 2 driving the alternator 6 attached to the engine 3 in response to the permission determination of the drive permission determining unit 20 provided in the control unit. 2 to charge the battery 9 by the generated power of the alternator 6.

The drive permission determining unit 20, in a case where a vehicle is during deceleration, determines whether to perform a drive of the alternator 6 based upon the SOC (charging rate) of the battery 9;

The drive permission determining unit 20, in a case where the vehicle is not during deceleration, determines whether to perform the drive of the alternator 6 based upon the engine efficiency and the SOC of the battery 9; and drives or stops the alternator 6 in response to the determination on whether to perform the drive of the alternator 6.

With this configuration, when the alternator 6 is driven in a case where the vehicle is during deceleration, since, the alternator 6 is driven by the regenerative energy to generate the power, high fuel consumption performance is realized.

In addition, for coping with a charge shortage of the battery 9, in a case of generating the power by driving the alternator 6 when the vehicle is not during deceleration, whether to perform the drive, of the alternator 6 is determined in consideration of not only the SOC but also the engine efficiency. Thereby, it is possible, to suppress the consumption of the engine output with a detailed measure.

More specifically (2) the drive permission determining unit 20, in a case where the vehicle is during deceleration, permits the drive of the alternator 6 when the SOC of the battery 9 is equal tool: less than the maximum upper limit value SOCm for avoiding the overcharge of the battery 9;

the drive permission determining unit 20, in a case where the vehicle is not during deceleration, determine whether to perform the drive of the alternator 6 based upon the drive permission zone map; the drive permission zone map is defined by the drive permission upper limit line C defining the upper limit of the SOC permitting the drive of the alternator 6; and the drive permission upper limit line C is configured such that as the engine efficiency is the lower from the predetermined value α, i.e. as the power generation cost is the higher from the predetermined value α, the SOC is the lower.

Whether to drive a power generation by the alternator 6 is determined by referring to the drive permission zone map M2 defined with the drive permission upper limit line C.

With this configuration, the drive of the alternator 6 by is permitted only when the SOC of the battery 9 is within the drive permission zone Z which is defined by the drive permission upper limit line C in the drive permission zone map M2. Thus, the alternator 6 is not driven until the SOC becomes low in a situation where the SOC of the battery 9 is outside of the drive permission zone Z, the power generation cost is large and the fuel consumption is large.

That is, the alternator 6 is not driven only when the SOC is quite low and having no other choice than the charge of the battery regardless of deterioration of the fuel consumption.

Thereby, consumption of the engine output is remarkably decreased in contrast to the conventional example where the alternator is driven without reference to the engine efficiency. Thus, the fuel consumption performance is improved.

(3) The drive permission zone map M2 includes the plurality of drive permission upper limit lines (Ca, Cb, Cc) such that the SOC becomes higher as compared to when the power consumption of the in-vehicle device 10 is small and such that the degree of the increase of the SOC the becomes higher as the power consumption of the in-vehicle device 10 is the larger; and The drive permission determining unit 20, in a case where the vehicle, is not during deceleration, drives the alternator 6 based upon the power consumption of the battery load. In this case, the drive of the alternator 6 is allowed even when the SOC is the higher as compared to when the power consumption is small as the power consumption is the larger.

With this configuration, since the power consumption is considered in addition to the power generation cost and the SOC, the alternator 6 is driven with the SOC corresponding to a progressive level of the discharge of the battery 9. Thus, the battery charge at the non-deceleration can be done in a timely manner.

(4) The SOC is the maximum upper limit value SOC when the engine efficiency in the drive permission upper limit line C is the predetermined value α. The SOC indicated in the drive permission upper limit line C is decreased from the maximum upper limit value SOCm following an increase in power generation costs i.e. decrease in an engine efficiency.

With this configuration, in a case where the power generation cost is lower than the predetermined value α, when the SOC is equal to or less than the maximum upper limit value SOCm, as similar to a case where the vehicle is during deceleration, the alternator 6 can be driven and there is almost no adverse effect on the fuel consumption performance.

(5) In a case where the vehicle is during deceleration, the alternator 6 is always driven until the SOC of the battery 9 reaches the maximum upper limit value SOCm (charge limit value) for avoiding the overcharge of the battery 9.

With this configuration, the battery 9 can be charged by the power low in the power generation cost by the regenerative energy.

(6) The engine efficiency is relevant to the power generation cost of the alternator 6, and an increase in the power generation cost corresponds to a decrease in the engine efficiency.

With this configuration, since the power generation cost of the alternator 6 is used as the engine efficiency, an appropriate drive control directly related to the fuel consumption is performed.

(7) In a case where the vehicle is not during deceleration, the threshold of the SOC of the battery 9 for permission of a drive of the alternator 6 is set to be the higher as the engine efficiency is the higher and is set to be the lower as the engine efficiency is the lower.

With this configuration, as the engine efficiency is the higher, a drive time of the alternator 6 is the longer. Therefore the battery 9 can be charged by the power low in the power generation cost.

It should be noted that in the present embodiment, the power generation cost is used as the engine efficiency, but besides, a cost per output or simply a fuel consumption rate may be used.

The power consumption is calculated based upon the drive, device information notifying which one of the in-vehicle devices 10 is driven, but not limited thereto. The power consumption may be measured by power meters installed in power supply lines to the in-vehicle devices 10 from the battery 9.

In addition, the determination on whether or not the vehicle is during deceleration is made possible also by detection of zero of the accelerator opening instead of zero of the fuel injection quantity.

If the estimation of the SOC is made only by the terminal voltage of the battery 9, the simpler configuration is made possible and the processing speed the control unit 2 is increased.

The alternator 6 is made to be the drive/non-drive state, by the supply/cutoff of the field current, but may be configured to be mechanically connected/disconnected to a rotational shaft of an engine by a solenoid or the like.

In addition, in a case where the battery 9 is a lead battery, for efficiently reserving the generated power a case where, a deceleration period of the vehicle short, a sub-battery composed of, for example, a capacitor in addition to the battery 9 may be also connected to the alternator 6.

Second Embodiment Relating to a Drive Control of the Alternator 6

Hereinafter, an explanation will be made of a second embodiment relating to a drive control of the alternator 6.

Figure 5:
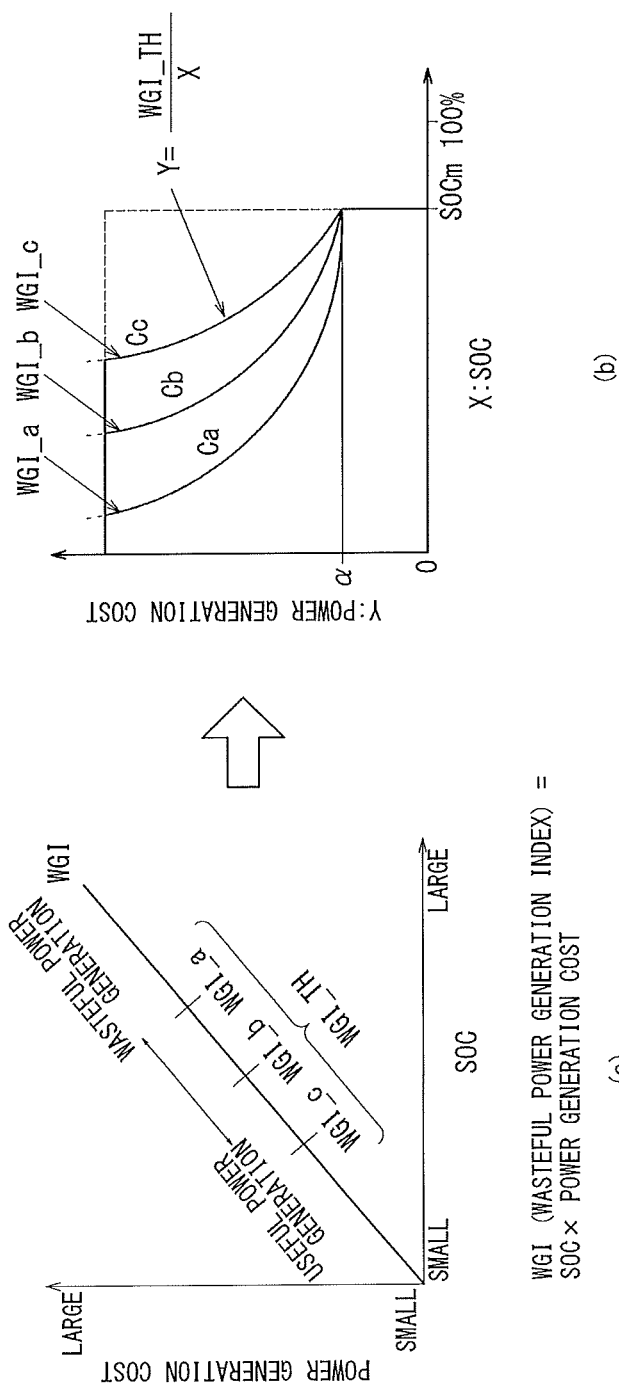
FIG. 5 is graphs explaining a relation between a WGI (wasteful power generation index) and a drive permission upper limit line.

FIGS. 5A and 5B is graphs illustrating a relation between a WGI (wasteful power generation index) and a drive permission upper limit line C. FIG. 5A is a graph explaining a relation between the WGI, the SOC and the power generation cost. FIG. 5B is a graph indicative of drive permission upper limit lines Ca to Cc determined corresponding to thresholds (WGI_a to WGI_c) set by the WGI.

FIGS. 6A and 6B is graphs explaining a threshold (power generation stop threshold SOCs) for stopping power generation by the alternator 6. FIG. 6A is a graph explaining a relation between the power generation stop threshold SOCs and the drive permission zone map M2 illustrated in FIG. 4. FIG. 6B is a schematically-illustrated drive permission zone map. This drive permission zone map shows a part of the drive permission zone map illustrated in FIG. 6A and is prepared by drawing out a region between a lower limit value (SOC_min) of the SOC set for avoiding the overcharge of the battery 9 and an upper limit value (maximum upper limit value SOCm) of the SOC set for avoiding the overcharge of the battery 9.

It should be noted that the drive permission zone map illustrated in FIG. 6B is, for descriptive purposes, schematically illustrated for easy understanding of a region of a regeneration reception capacity, and in the explanation as follow, the schematically illustrated drive permission zone tap will be used for explanation.

In the second embodiment, for preventing the battery 9 from being charged by generating power in a high generation cost when there, is no imminent necessity for charging, one index (WGI (wasteful power generation index)) for determining whether to be a wasteful power generation index is used. This index (WGI (wasteful power generation index)) is used to set the drive permission upper limit line C in the drive permission zone map M2, and the drive permission upper limit line C is used to determine whether to drive the alternator 6.

Further, in the second embodiment, the battery 9 is not charged until the maximum upper limit value SOCm. The battery 9 is charged to leave a capacity (regeneration reception capacity) for the charging of the power generated by the regenerative energy using the power generation stop line (power generation stop threshold SOCs) on a basis of the SOC.

Hereinafter, an explanation will be specifically made of the second embodiment.

First, an explanation will be made of the relationship between the SOC (charging rate) of the battery 9 and the power generation cost.

As described before, in the first embodiment, in a case where the vehicle is not during deceleration, whether to perform the power generation is determined based upon in which one of a power generation region and a discharge region the SOC of the battery 9 is. Here, in the drive permission zone map M2 (see FIG. 2), the drive permission upper limit line C is a boundary between these regions.

For example, in a case of the drive permission upper limit line Ca in FIG. 4, the left side from the drive permission upper limit line Ca is the power generation region (drive permission zone Z) and the right side is the discharge region.

The determination on whether to perform the power generation is made, based upon the concept as follows.
1) When the SOC is large and the power generation cost is large, the power is not generated (no permission of power generation).
2) When the SOC is large and the power generation cost is small, the power is generated depending upon a magnitude of the power generation cost (conditional permission of power generation).
3) When the SOC is small and the power generation cost is large, the power is generated depending upon a magnitude of the SOC (conditional permission of power generation).
4) When the SOC is small and the power generation cost is small, the power is generated (permission of power generation).

The drive permission upper limit line C defines the boundary between "permission of power generation and no permission of power generation" based upon this concept, and the boundary between "permission of power generation and no permission of power generation" is determined in accordance with two variants of the SOC and the power generation cost.

Here, when the SOC and the power generation cost are multiplied, the variants to be used in determination on whether to perform the power generation by the alternator 6 can be made to one variant. This enables to set the boundary between "permission of power generation and no permission of power generation" to time-series data as a straight line.

In the present embodiment, the one made variant is used as an index (above-mentioned WGI) for determination on wasteful power generation (refer to FIG. 5A). In this index, as a value of the WGI is the larger, i.e. as being the nearer to the oblique upper side, the more wasteful power is generated. Also, as the value of the WGI is the smaller, i.e. as being the nearer to the oblique, lower side, the more useful power is generated.

In addition, in the present embodiment, a threshold WGI_TH for determination on whether to perform the power generation is set on the WGI, and the above-mentioned drive permission upper limit lien C is set from the set threshold WGI_TH.

Specifically a region (curved line region in FIG. 5B) in which the SOC is the lower as the power generation cost in the drive permission upper limit line C (Ca to Cc) is the higher from the predetermined value α can be expressed in the following formula (1), wherein a Y axis is indicative of a power generation cost and an X axis is indicative of an SOC (refer to FIG. 5B).

$$Y = (WGI\_TH)/X \quad (1)$$

Accordingly when the WGI_TH is determined, a value of the SOC (threshold SOC) as a boundary for determining whether to perform the power generation is found for each power generation cost according to this formula (1).

The setting of the threshold in the WGI may be made in consideration of WLTP (Worldwide Harmonized Light Vehicles Test Procedure) that is one of fuel consumption test methods.

Specifically according to the WLTP, in a case where an auxiliary battery (battery 9 supplying a drive power of an in-vehicle device) is charged using a driving force of an engine, a remaining quantity (SOC: charging rate) of the auxiliary battery at the completion of the fuel consumption test is also reflected on the test result to correct the test result.

A correction quantity (ΔFCphase (i)) of the test result at this time is calculated from the following formula.

$$\Delta FC_{phrase\ (i)} = \Delta E_{el\text{-}phase\ (i)} \times 1/\eta_{alternator} \times \text{Willans}_{factor} \quad \text{[Formula 1]}$$

Herein $\Delta E_{el\text{-}phase\ (i)}$ is indicative of power, $\eta_{alternator}$ is indicative of an alternator efficiency, $\text{Willans}_{factor}$ is indicative of a gasoline-power conversion efficiency, and the alternator efficiency and the gasoline-power conversion efficiency each are a fixed value.

In the formula of the correction quantity, the correction quantity ($\Delta FC_{phase\ (i)}$) is found from the power of the battery, the alternator efficiency and the gasoline-power conversion efficiency, i.e. the correction quantity is defined by characteristics of a vehicle. "$1/\eta_{alternator} \times \text{Willans}_{factor}$" corresponds to a power generation cost.

Herein when the power generation cost in consideration of the correction quantity in the WLTP test is indicated at $Y_{WLTP}$, the above formula (1) (Y=(WGI_TH)/X) can be expressed by the following formula (2).

$$WGI\_TH = Y_{WLTP} \times X = ((1/\eta_{alternator}) \times \text{Willans}_{factor}) \times X = \text{(correction quantity in the } WLTP \text{ test/power)} \times X \quad (2)$$

Since X in the above formula (2) is the SOC of the battery 9, the above formula (2) can be expressed as follows.

$$WGI\_TH = \text{(correction quantity in the } WLTP \text{ test/power)} \times SOC$$

Accordingly the WGI_TH is found by setting the maximum upper limit value SOCm or the charge start threshold SOCc (as described later).

In the present embodiment, the threshold is set on the above-mentioned WGI in consideration of an influence on the test result, and the drive permission upper limit line C (refer to FIG. 4) set from the threshold set on the WGI is used to determine whether to perform the drive of the alternator 6.

As a result, in a fuel consumption evaluation at the travelling of an actual vehicle, the result close to a fuel consumption conversion according to WLTP can be acquired.

In addition, fuel consumption evaluations between different kinds of vehicles can be more fairly determined according to the WLTP.

Further, in the above-mentioned first embodiment, the charge of the battery 9 by the drive of the alternator 6 is performed to the extent that the SOC (charging rate) of the battery 9 does not go beyond the maximum upper limit value SOCm for avoiding the overcharge.

Therefore when the SOC (charging rate) of the battery 9 already reaches the maximum upper limit value SOCm, since the charge to the battery 9 is not performed, a deceleration travel of a vehicle starts at this state, and even if the alternator 6 generates power by the regenerative energy due to the deceleration, the battery 9 cannot be charged by the generated power.

Here, since the power generation cost in a case of using the regenerative energy is lower than the power generation cost in a case of using the driving force of the engine, when the SOC of the battery 9 reaches the maximum upper limit value SOCm, the power generated in the low power generation cost cannot, be used for charging the battery 9.

Therefore for enabling the power that is generated by the regenerative energy and is generated in the low power generation cost to be used for charging the battery 9, an upper limit value, (power generation stop threshold SOCs) in a case of using the power generated by the driving force of the engine for charging the battery 9 is set to a side lower in the SOC than the maximum upper limit value SOCm (refer to FIGS. 6A and 6B).

Therefore in the drive permission zone map illustrated in FIGS. 6A and 6B, a region (regeneration reception capacity) for the charging of the power generated by the regenerative energy is ensured in a side (right side in the figure) higher in the SOC than the power generation stop threshold SOCs. For example, in a point where the SOC reaches the power generation stop threshold SOCs, the power generation by the alternator 6 using the driving force of the engine 3 is terminated, thereby terminating the charging to the battery 9.

When the power generation of the alternator 6 using the regenerative energy is started in this state, the power generated by the regenerative energy can be used for charging the battery 9 until the SOC reaches the maximum upper limit value SOCm.

Here, the present embodiment is configured to be able to change the power generation stop threshold SOCs according to a traveling state of a vehicle.

Figure 7:
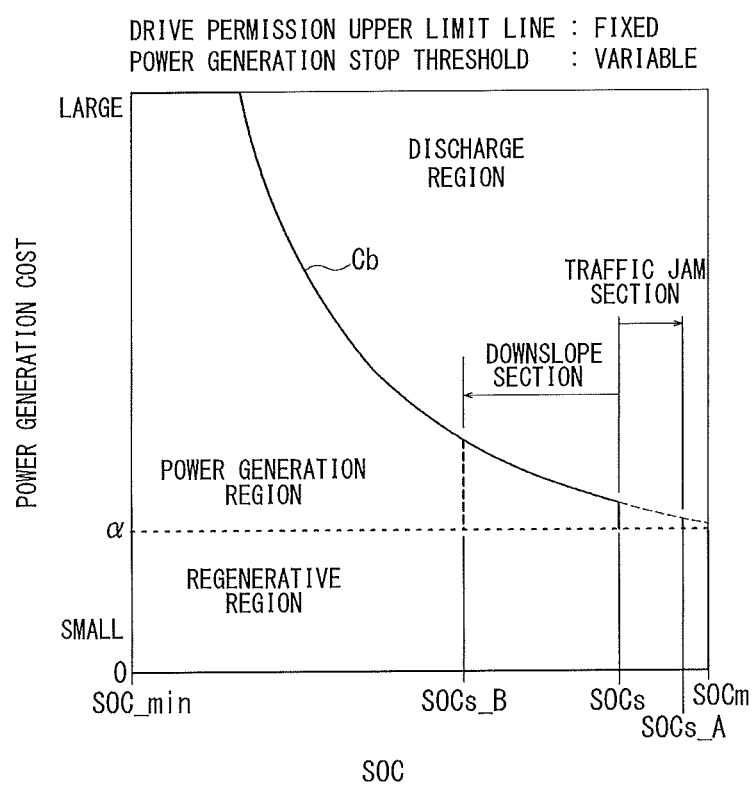
FIG. 7 is a graph explaining a setting of the power generation stop threshold.

Specifically in a case where there is a traffic jam section or a downslope section on the path where an own vehicle is scheduled to travel, the power generation stop threshold SOCs is designed to change (refer to FIG. 7).

Here, since a large deceleration does not occur in the traffic lam section, the battery 9 is consumed to lower the SOC at the time the vehicle travels through the traffic jam section. In addition, since it is possible to perform the power generation using the regenerative energy in the downslope section, the battery 9 can be charged in the low power generation cost to increase the SOC.

Therefore in the second embodiment, in a case where the traffic jam section is on the path where its own vehicle is scheduled to travel, the power generation stop threshold SOCs is changed to a side closer to the maximum upper limit value SOCm (to a side higher in the SOC) for preliminarily causing the battery 9 to be charged by more power.

In addition, in a case where the downslope section is on the path where its own vehicle is scheduled to travel, since there is an opportunity of the charging in a low power generation cost in the future, the power generation stop threshold SOCs is changed to a side away from the maximum upper limit value SOCm (to a side lower in the SOC) for preliminarily ensuring a capacity for enabling the charging in the low power generation cost.

Hereinafter, an explanation will be made of a drive process of the alternator 6 accompanied by a change of the power generation stop threshold SOCs according to a traveling state of a vehicle by using a flow chart in FIG. 8.

First, at step 201 a power generation stop threshold setting unit 21 confirms whether or not there is a traffic jam section on the path where its own vehicle is scheduled to travel.

Here, presence/absence of the traffic jam section can be confirmed from a position of its own vehicle and traffic jam information acquired from a navigation device 16, for example.

In a case where the traffic jam section is on the path where its own vehicle is scheduled to travel (Yes at step 201), at step 202 the power generation stop threshold setting unit 21 calculates estimation power consumption at the time the vehicle passes through the traffic jam section.

The estimation power consumption can be calculated front the following formula (2).

$$\text{Estimation power consumption} = \text{prediction time for traffic jam passing} \times \text{average power consumption at the traffic jam} \qquad (2)$$

Here, the prediction time for the traffic jam passing can be found from a distance of the traffic jam section and an average travelling speed of a vehicle predicted in the traffic jam section. The distance of the traffic jam section and the predicted average travelling speed of the vehicle can be calculated from the traffic jam information acquired from the navigation device 16, for example.

In addition, the average power consumption at the traffic jam, after referring to the drive device information stored in the RAM 26 to identify the in-vehicle device driving at the present point, can be calculated from the power consumption data of the driving in-vehicle device and the prediction time for the traffic jam passing.

At subsequent step 203 the power generation stop threshold setting unit 21 calculates a power quantity by which the battery 9 is charged by the time of reaching the traffic jam section. Then, power generation stop threshold setting unit 21 determines a changed power generation stop threshold SOCs_A from the calculated power quantity. At step 204 the power generation stop threshold setting unit 21 changes the power generation stop threshold SOCs to the changed power stop threshold SOCs_A.

Thereby since the power generation stop threshold SOCs is changed to a value (SOCs_A) in the side higher in the SOC to increase the upper limit of the power quantity by which the battery 9 can be charged, the battery 9 becomes in a state of being able to be charged by much power corresponding to the increased quantity.

In addition, at step 205 the power generation stop threshold setting unit 21 confirms whether or not a vehicle passes through the traffic jam section, and in a case where the passing of the traffic jam section is confirmed (Yes at step 205), at step 206 the power generation stop threshold setting unit 21 returns the power generation stop threshold from the changed power generation stop threshold SOCs_A back to the original the power generation stop threshold SOCs, and thereafter, the process returns back to step 201.

It should be noted that while its own vehicle is passing through the traffic jam section, since the alternator 5 is driven by the driving force of the engine as needed to perform the charging of the battery 9, the battery 9 is not excessively consumed.

Figure 8:
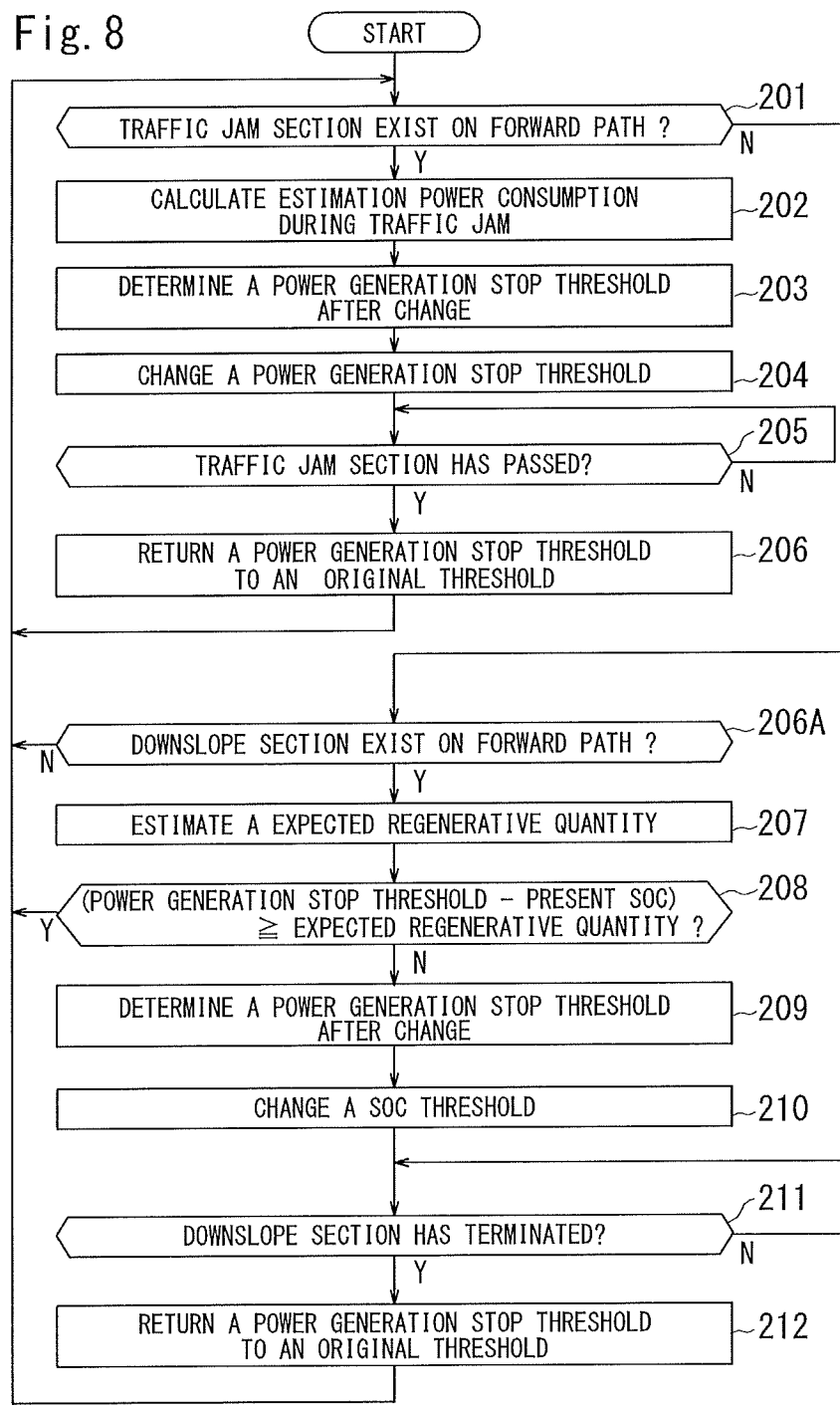
FIG. 8 is a flow chart explaining a drive process of the alternator accompanied by a change of the power generation stop threshold.

It should be noted that, in the flow chart in FIG. 8, while its own vehicle is passing through the traffic jam section, the power generation stop threshold SOCs is maintained in a state of the changed power generation stop threshold SOCs_A, but in a point where its own vehicle reaches the traffic jam section, it may be returned back to the original power generation stop threshold SOCs.

At step 201 as described before, in a case where there is no traffic jam section on the path where its own vehicle is scheduled to travel (No at step 201), the process transfers to step 206A.

At step 206A, the power generation stop threshold setting unit 21 confirms whether or not there is a downslope section on the path where its own vehicle is scheduled to travel.

Here, presence/absence of the downslope section can be confirmed from a position of its own vehicle and map information acquired from the navigation device 16, for example.

In a case where the downslope section is on the path where its own vehicle is scheduled to travel (Yes at step 206A), at step 207 the power generation stop threshold setting unit 21 calculates power (expected regenerative quantity) that can be generated by regenerative energy at the time a vehicle passes through the downslope section.

Specifically the expectable regenerative quantity (expected regenerative quantity) is estimated based upon potential energy that can be acquired from altitude difference information of the downslope section.

Here, in the present embodiment, the expected regenerative quantity that can be expected at the time a vehicle passes through the downslope section is estimated from the following formula (3).

$$\text{Potential energy}=\text{kinetic energy}+\text{expected regenerative quantity}+\text{consumed energy of a vehicle} \quad (3)$$

Here, the kinetic energy of a vehicle is kinetic energy necessary in the downslope section and can be calculated from an average traveling speed at the present point.

The consumed energy includes thermal energy consumed in a brake or in a frictional system at the time a vehicle passes through the downslope section, and energy consumed by an operation of an engine brake.

Therefore the expected regenerative quantity can be found by subtracting the kinetic energy and the consumed energy of the vehicle from the potential energy. In the present embodiment, the expected regenerative quantity is estimated based upon elements such as an output voltage of the alternator 6, an internal resistance of the battery 9 and the like with the upper limit being set to the found expected regenerative quantity.

When the expected regenerative quantity is estimated (step 207), at subsequent step 208 the power generation stop threshold setting unit 21 confirms whether or not a difference between the power generation stop threshold SOCs and the SOC at the present point is equal to or more than the expected regenerative quantity.

In a case where the difference ΔSOC between the power generation stop threshold SOCs and the SOC at the present point is equal to or more than the expected regenerative quantity (Yes at step 208), the process returns to step 201 without changing the power generation stop, threshold SOCs.

This is because even if the power generations stop threshold SOCs is not changed, the power generated by the regenerative energy in the downslope section can be all used for charging the battery 9.

On the other hand, a case where the difference ΔSOC between the power generation stop threshold SOCs and the SOC at the present point is not equal to or more than the expected regenerative quantity (No at step 208) indicates a case where when the power generation stop threshold SOCs is not changed, not all the power generated by the regenerative energy in the downslope section can be used for charging the battery 9. Therefore at step 209 the power generation stop threshold setting unit 21 determines a changed power generation stop threshold SOCs_B.

Specifically the changed power generation stop threshold SOCs_B enabling ail the power generated by the regenerative energy to be used for charging the battery 9 is determined corresponding to a difference between the ΔSOC and the expected regenerative, quantity.

Thereby since at step 210 the power generation stop threshold setting unit 21 changes the power generation stop threshold SOCs to the changed power generation stop threshold SOCs_B, the power generation stop threshold is changed to a side lower in the SOC to increase the regeneration reception capacity.

In addition, at step 211 the power generation stop threshold setting unit 21 confirms whether or not a vehicle passes through the downslope section. In a case where the passing of the downslope section is confirmed (Yes at step 211), at step 212 the power generation stop threshold setting unit 21 sets the power generation stop threshold SOCs from the changed power generation stop threshold SOCs_B back to the original power generation stop threshold SOCs_A, and thereafter, the process returns back to step 201.

In this way, in the second embodiment, in a case where the increased SOC by the power generation of the alternator 6 intersects with a drive permission upper limit line Cb (increase in the SOC from position P1 to position P2 in FIG. 6), the drive of the alternator 6 is stopped in a point where the SOC reaches the position P2 to terminate the charging to the battery 9.

Figure 6:
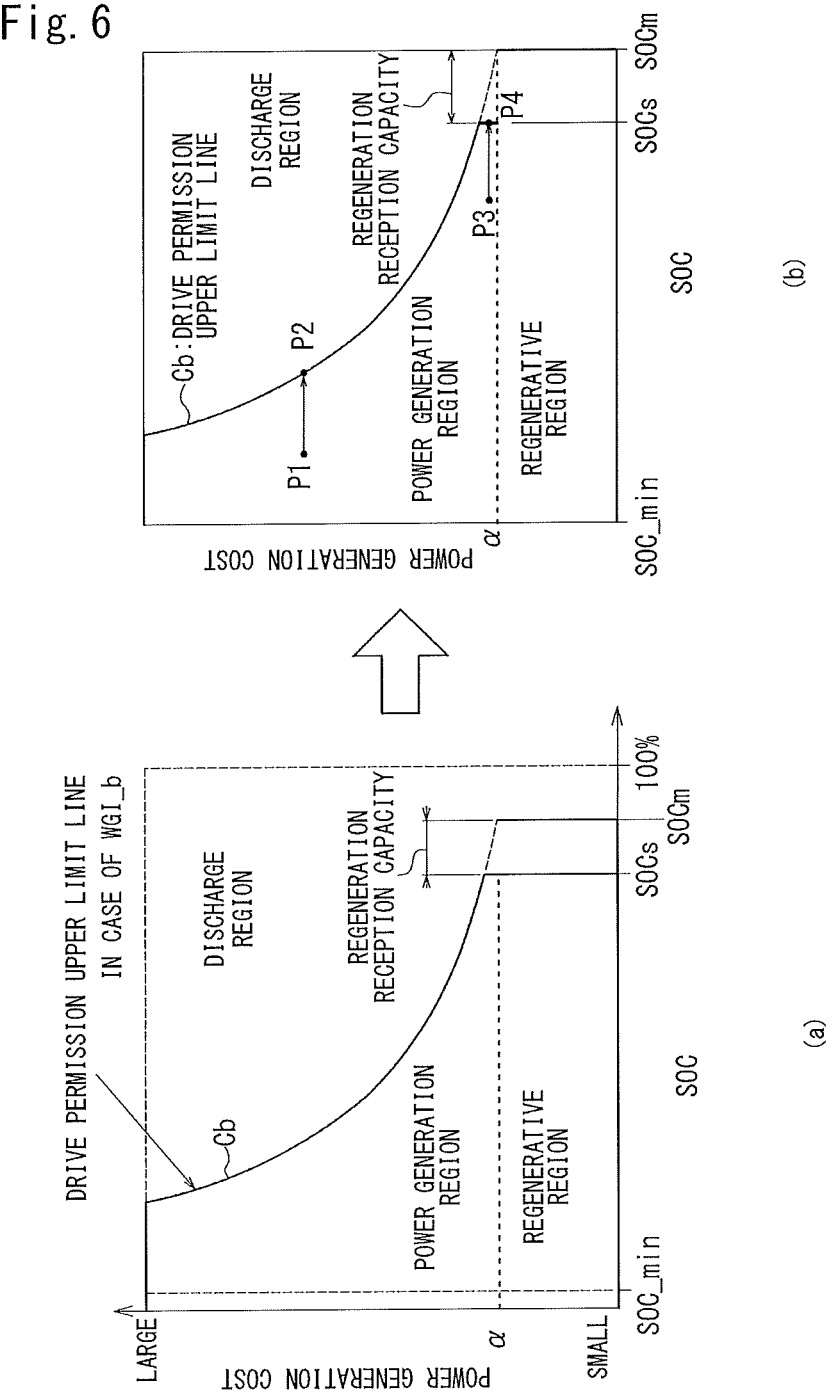
FIG. 6 is graphs explaining a power generation stop threshold.

In addition, in a case where the increased SOC by the power generation of the alternator 6 intersects with the power generation stop threshold SOCs (increase in the SOC from position P3 to position P4 in FIG. 6(*b*), the drive of the alternator 5 is stopped in a point where the SOC reaches the position P4 to ensure a capacity (regeneration reception capacity) for the charging of the power generated by the regenerative energy.

In addition, in a case where the traffic jam section is on the path where its own vehicle is scheduled to travel, the power generation stop threshold SOCs is changed to a side closer to the maximum upper limit value SOCm (a side higher in the SOC) for preliminarily causing the battery 9 to be charged by more power.

In addition, in a case where the downslope section is on the path where its own vehicle is scheduled to travel, since there is an opportunity of the charging in a low power generation cost in the future, the power generation stop threshold SOCs is changed to a side away from the maximum upper limit value SOCm (a side lower in the SOC) for preliminarily ensuring a capacity enabling the charging in the low power generation cost.

Therefore since it is possible to suppress a drive time of the alternator 6 in the traffic jam section in which the alternator 6 can generate power by a driving force of the engine, a decrease in the power generation cost is made possible.

In addition, it is possible to prevent the power generated by the regenerative energy from being wasteful by the event that the SOC reaches the maximum upper limit value SOCm in the middle of charging the battery 9 with the power generated by the regenerative energy during the travelling in the downslope section.

In addition, it is possible to preliminarily suppress the SOC of the power generated by the driving force of the engine by predicting the power generation by the regenerative energy in the downslope section. Thereby, contribution to an improvement on fuel consumption can be expected by decreasing the engine load by that quantity.

[Modification 1]

In the second embodiment, a case where the power generation stop threshold SOCs is changed according to the travelling state of the vehicle is exemplified. But the threshold WGI_TH in the WGI (wasteful power generation index: refer to FIG. 5(a)) may include a plurality of thresholds (WGI_a to WGI_c) that are preliminarily set to prepare for a plurality of drive permission upper limit lines C (Ca to Cc). In this case, it may be possible to change the drive permission upper limit line C according to the traveling state of the vehicle by changing from among a plurality of drive permission upper limit lines C (Ca to Cc).

Figure 9:
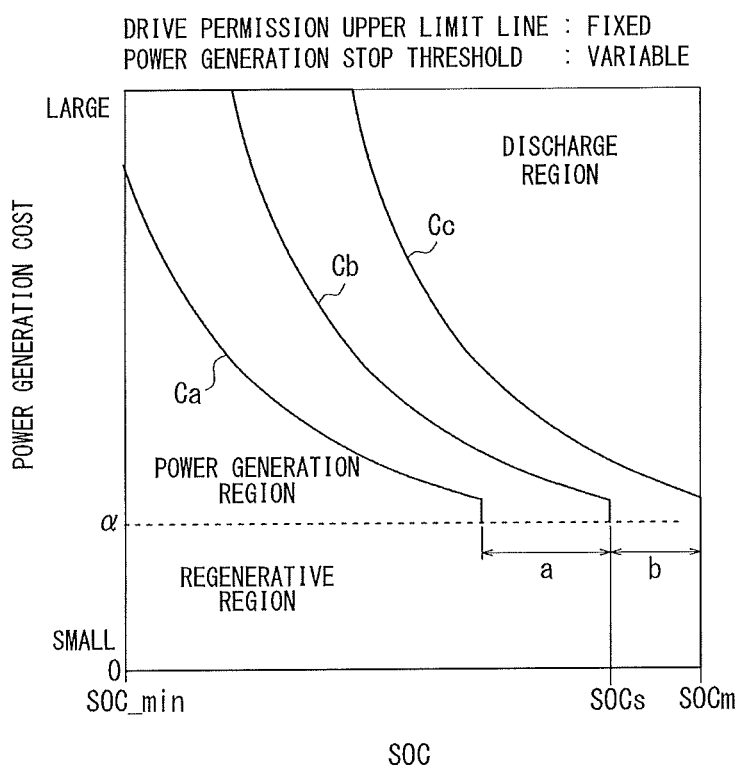
FIG. 9 is a graph explaining a threshold in the WGI and the power generation stop threshold.

FIG. 9 is a graph explaining the plurality of drive permission upper limit lines C (Ca to Cc) and the power generation stop threshold SOCs. Each of the drive permission upper limit line C (Ca to Cc) is obtained when setting the threshold WGI_TH in the WGI to the plurality of thresholds (WGI_a to WGI_c).

In the above-mentioned second embodiment, the one threshold WGI_TH for determining whether to perform the power generation is set on the WGI, and the one drive permission upper limit line C as described before is set from the one set threshold.

Therefore the threshold to be set on the WGI is set to the plurality of thresholds having widths therebetween, thus making it possible to introduce the plurality of drive permission upper limit lines C (Ca to Cc) corresponding to the respective thresholds on a one-to-one basis (refer to FIG. 9).

In a case of FIG. 9, there are illustrated the three drive permission upper limit lines composed of the drive permission upper limit line Ca by which a power generation region is the narrowest in a region where the power generation cost is high; the drive permission upper limit line Cc by which the power generation region is the widest n a region where the power generation cost is high; and the drive permission upper limit line Cb between the drive permission upper limit lines Ca, Cc.

Accordingly in a case where there is the traffic lam section on the path where its own vehicle is scheduled to travel, even if the power generation cost increases more or less, the cost is smaller than in a case of generating the power at the time a vehicle is traveling in the traffic jam section. Therefore the drive permission upper limit line Cc having a wide power generation permission region is selected to make it possible to perform the charging to the battery 9 in the power generation cost lower than at the time the vehicle is traveling in the traffic jam section.

In addition, in a case where the downslope section is on the path where its own vehicle is scheduled to travel, the charging by the power of the low power generation cost using the regenerative, energy is predicted. In this case, selecting the drive permission upper limit line Ca having a narrow power generation permission region, it is possible to perform the charging to the battery 9 in the lower power generation cost.

[Modification 2]

Further, the second embodiment has exemplified a case where there is the traffic am section or the downslope section on the path where a vehicle is scheduled to travel, as a case where the power generation stop threshold SOCs is changed according to the travelling state of the vehicle, but the power generation stop threshold SOCs may be changed in response to a travelling speed of the vehicle.

Figure 10:
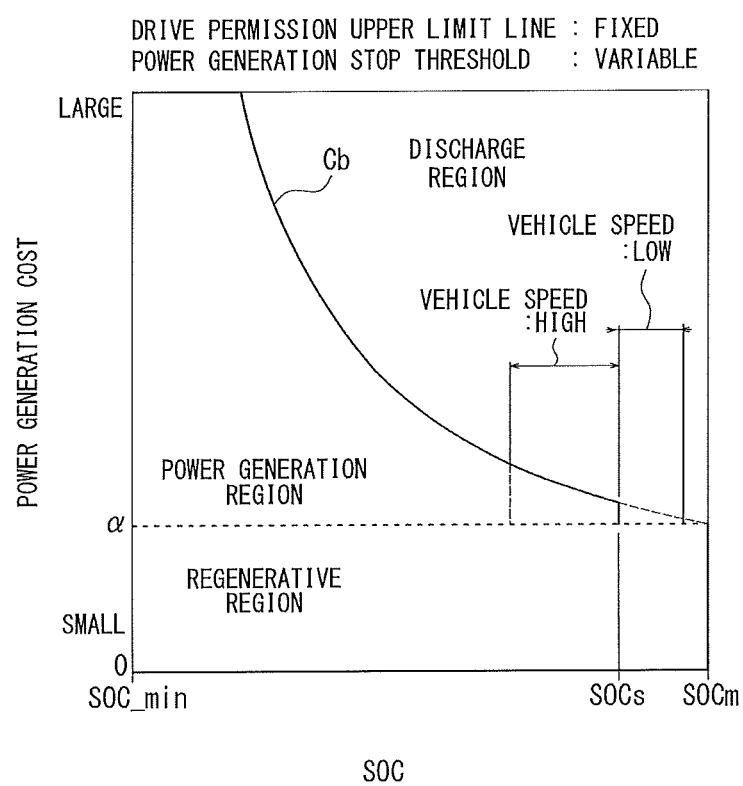
FIG. 10 is a graph explaining a change of the power generation stop threshold.

FIG. 10 is a graph explaining a case of changing the power generation stop threshold SOCs in response to the travelling speed of the vehicle.

For example, in a case where a vehicle travels in a high speed, since a large deceleration of the vehicle follows thereafter, the power generation by the regenerative energy can be expected. In addition, in a case where a vehicle travels in a low speed, since a large deceleration of the vehicle does not follow thereafter, the power generation by the regenerative energy cannot be expected.

Accordingly as illustrated in FIG. 10, at the high-speed traveling of a vehicle when the power generation by the regeneration can be expected, the power generation stop threshold SOCs may be changed to a side lower in the SOC to increase the regeneration reception capacity for the charging of the power generated by the regenerative energy. At the low-speed traveling of the vehicle when the power generation by the regeneration cannot be expected, the power generation stop threshold SOCs may be changed to a side higher in the SOC to increase a capacity for the charging of the power generated by a driving force of an engine.

It should be noted that the drive permission upper limit line C is not limited to the form composed of the three drive permission upper limit lines Ca to Cc as described before (refer to FIG. 9).

When the threshold WGI_TH is set to a plurality of thresholds on the WGI (wasteful power generation index), the drive permission upper limit lines C that are the same in number as the set thresholds WGI_TH are determined. Therefore the threshold to be set on the WGI is configured to be able to be optionally set, for example, between a lower limit and an upper limit preliminarily set, according to a travelling state of a vehicle, thus making it possible to freely set a drive permission upper limit line C optimal at this point.

In addition, whether to perform the power generation may be determined by a combination of the form of switching the drive permission upper limit lines C disclosed in the present modification and the form of changing the above-mentioned power generation stop threshold SOCs.

As described above, the second embodiment is configured such that:

(8) in a case where the vehicle is during deceleration, the threshold of the SOC of the battery 9 for stopping the alternator 6 is the charge limit value (maximum upper limit value SOCm) of the battery 9;

in a case where the vehicle is not during deceleration, the upper limit value (power generation stop threshold SOCs) in the threshold of the SOC of the battery 9 for permitting the drive of the alternator 6 is set to be smaller than the charge limit value (maximum upper limit value SOCm) in the SOC of the battery 9; and in the drive permission zone map, the upper limit value of the SOC for permitting the drive of the alternator 6, i.e. the upper limit value (power generation stop threshold value SOCs) of the SOC in a case where the vehicle is not during deceleration is set to the side lower in the SOC than the maximum upper limit value SOCm.

With this configuration, the battery 9 is not charged to the maximum upper limit value SOCm, but is charged leaving the capacity for the charging of the power generated by the regenerative energy using the power generation stop threshold SOCs (power generation stop line) on a basis of the SOC.

Thereby since the battery 9 can be charged by the power of the low power generation cost using the regenerative energy, a decrease of the power generation cost is made possible.

(7) The power generation stop threshold SOCs is set to a threshold that is specified by International Harmonized Exhaust Gas/Fuel Consumption Test Method for Passengers and is used for correcting fuel consumption corresponding to a charge/discharge power quantity by the battery at the RCB correction time.

With this configuration, when the threshold on the WGI is set in consideration of an influence on the result of the fuel consumption test by the Fuel Consumption Test Method and then the drive permission upper limit line C is set from the threshold set on the WGI, the drive permission upper limit line C which reflects an influence on the result of the fuel consumption test can be given. Thereby, since the drive permission upper limit line, C (refer to FIG. 4) set from the threshold set on the WGI is used to determine whether to perform the drive of the alternator 6, thus making it possible to expect a good test result.

(10) In a case where a travelling load of a vehicle on the travelling path is predicted and the travelling load is predicted to increase, the alternator 6 is driven until the battery 9 reaches the SOC higher than the power generation stop threshold as a reference.

With this configuration, in a case where the travelling load is predicted to increase, since the SOC of the battery 9 can be preliminarily increased to be high, a shortage of the SOC of the battery 9 can be appropriately prevented.

(11) In a case where a vehicle is not during deceleration, the threshold of the engine efficiency (power generation cost) for permitting the drive of the alternator 6 is the higher as the SOC of the battery 9 is the higher, and is the lower as, the SOC of the battery 9 is the lower.

With this configuration, the battery 9 can be charged by the power which is generated in the low power generation cost and is generated during the engine efficiency (power generation cost) is high.

(12) The power generation stop threshold setting unit 21 (upper limit value setting unit) that sets the power generation stop threshold SOCs is provided;

the power generation stop threshold setting unit 21 changes the power generation stop threshold SOCs in response to an increase/decrease prediction of the SOC;

in a case where the decrease of the SOC is predicted, the power generation stop threshold setting unit 21 changes the power generation stop threshold SOCs to the side higher in the SOC; and in a case where the increase of the SOC is predicted, the power generation stop threshold setting unit 21 changes the power generation stop threshold SOCs to the side lower in the SOC.

With this configuration, in a case where the decrease of the SOC is predicted, the power generation stop threshold SOCs is changed to the side higher in the SOC. Thereby, since it is possible to preliminarily increase the SOC of the battery 9, a shortage of the SOC can be appropriately prevented.

In addition, in a case where the increase of the SOC is predicted, the power generation stop threshold SOCs is changed to the side lower in the SOC to ensure a reception quantity of the power in the battery 9.

Thereby, since it is possible to prevent the generated power from being unusable for charging the battery 9, so it is possible to appropriately prevent the generated power from being wasteful.

(13) The travelling state determining unit 22 (increase/decrease predicting unit of SOC) is provided;

the travelling state determining unit 22 predicts the decrease of the SOC in a case where the traffic jam section or the upslope section is present on the path where a vehicle is scheduled to travel; and the travelling state determining unit 22 predicts the increase of the SOC in a case where the downslope section is present on the path where the vehicle is scheduled to travel.

With this configuration, in a case where the downslope section is present on the path where the vehicle is scheduled to travel, the power of the low power generation cost generated by the regenerative energy at the time of travelling in the downslope section can be used for charging the battery 9 until nothing is left.

In addition, in a case where the traffic jam section or the upslope section is present on the path where a vehicle is scheduled to travel, it is possible to appropriately prevent occurrence of the event that the SOC is being lacking at the time a vehicle passes through the traffic jam section or the upslope section and the power cannot help but to be generated in the high power generation cost.

(14) The drive permission upper limit line C is set using one threshold WGI_TH set on one, index (wasteful power generation index: WGI) found by multiplying the engine efficiency (power generation cost) and the SOC of the battery 9.

With this configuration, an appropriate drive permission upper limit line C is determined from the one threshold set on the wasteful power generation index (WGI). Thereby, the power generation by the drive of the alternator 6 is, controlled while maintain a balance between the wasteful power generation and the useful power generation, thus making it possible to optimize the power generation cost of the power for the charging of the battery 9.

(15) Particularly the threshold in the WGI is set such that a remaining quantity (SOC: charging rate) of the auxiliary battery at completion of the fuel consumption test becomes an appropriate remaining quantity in consideration of the WLTP as one of the fuel consumption test methods. Therefore an appropriate drive permission upper limit line C is set from the one threshold set on the WGI, making it possible to acquire a preferable test result.

(16) The one threshold set on the WGI is set in response to an increase/decrease prediction of the SOC in the battery 9.

With this configuration, the appropriate drive permission upper limit line C can be set in response to the increase/decrease prediction of SOC. Thereby, the power generation by the drive of the alternator 6 is controlled while maintaining a balance between the wasteful power generation and the useful power generation, thus making it possible to optimize the power generation cost of the power for the charging of the battery 9.

Third Embodiment Relating to a Drive Control of the Alternator 6

Hereinafter, an explanation will be made of a third embodiment relating to a drive control of the alternator 6.

Figure 11:
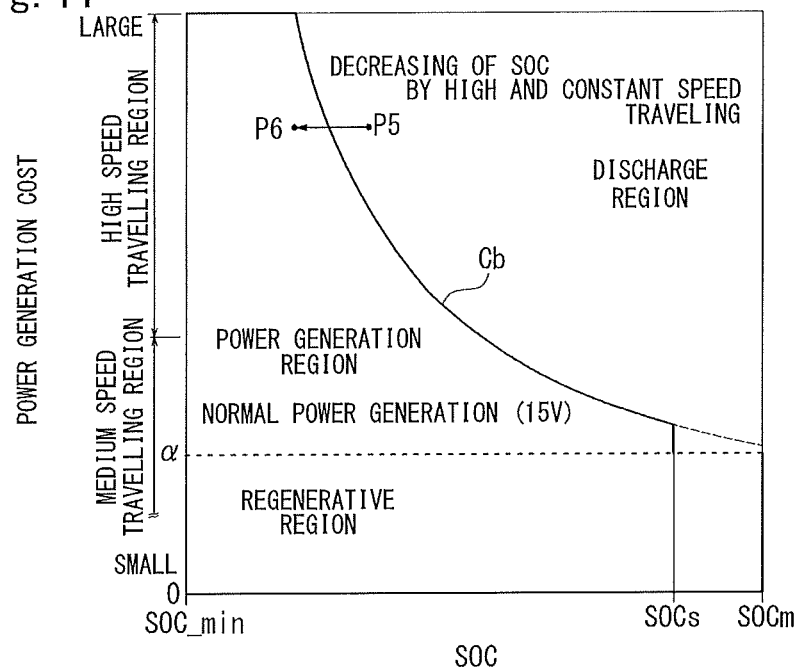
FIG. 11 is a graph explaining a relation between an SOC of a battery and a power generation cost during the high-speed constant-speed travelling of a vehicle.

FIG. 11 is a graph explaining a relation between an SOC (charging rate) of the battery 9 and a power generation cost when a vehicle, travels in a substantially constant high-speed (at the high-speed constant speed travelling) by using a drive permission zone map.

Figure 12:
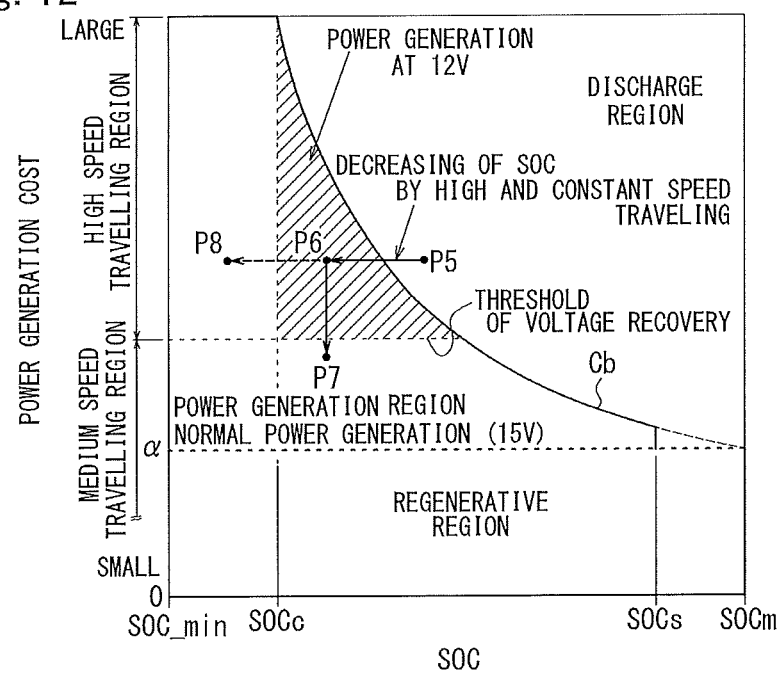
FIG. 12 is a graph explaining a drive permission zone map in a case of changing a power generation voltage of the alternator.

FIG. 12 is a graph explaining a drive permission zone map in a case of changing a power generation voltage of the alternator 6.

Figure 13:
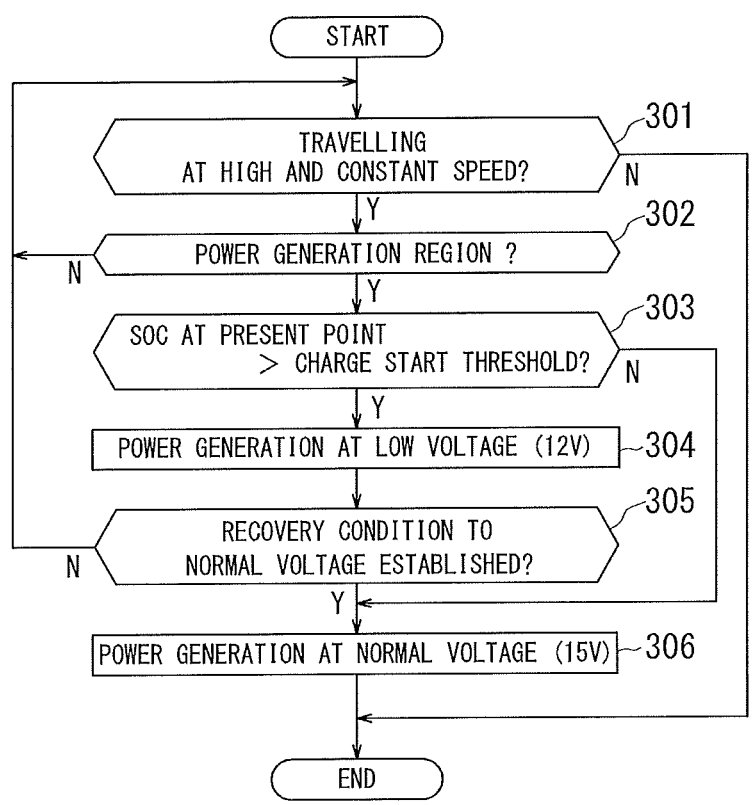
FIG. 13 is a flow chart explaining a drive process of the alternator accompanied by a change of the power generation voltage.

FIG. 13 is a flow chart explaining a drive process of the alternator 6 accompanied by a change, of a power generation voltage, according to a travelling state of a vehicle.

In the third embodiment, when the power generation by the alternator 6 leads to the high power generation cost, not the charging of the battery 9 but the power generation by the alternator 6 is performed in a range where the discharge of the battery 9 can be suppressed.

Hereinafter, an explanation will be specifically made of the third embodiment.

First, an explanation will be made of a relation between an SOC (charging rate) of the battery 9 and a power generation cost when a vehicle travels in a substantially constant high-speed (at the high-speed constant speed travelling).

For example, when a vehicle travels, in a substantially constant high-speed as in a case of travelling on the expressway (at the high-speed constant speed travelling), since the power generation by the regenerative energy cannot be expected, the charging to the battery 9 is performed by the power generation using a driving force of the engine 3.

However, when power is generated by driving the alternator 6 with the driving force of the engine 3 at the vehicular high-speed travelling subjected to a large engine load, the engine load is further increased to deteriorate the fuel consumption performance.

Therefore the power generation using the driving force of the engine 3 at the vehicular high-speed travelling becomes the power generation high in power generation costs.

However, the in-vehicle device to be driven with the power from the battery 9 is driven even at the high-speed travelling to consume, the power of the battery 9, and therefore in a state where the power generation by the alternator 6 is not performed, the SOC decreases with time.

Then, as illustrated in FIG. 11, in a case where the SOC decreases from position P5 to position P6 in FIG. 11, the SOC is determined to be in a power generation region in a point where the SOC crosses the drive permission upper limit line Cb to a side lower in the SOC, resulting in driving the alternator 6.

Therefore even at the vehicular high-speed travelling subjected to a high power generation cost, it becomes necessary to perform the power generation by driving the alternator 6 using the driving force of the engine.

Therefore, in this embodiment, in a case where it is necessary to perform the power generation at the high power generation cost using the driving force of the engine, the power generation is controlled to the requisite minimum by outputting a voltage (12V) from the alternator 6.

Here, a voltage (12V) is lower than a normal power generation voltage (15V) by which the battery 9 can be charged and is the minimum voltage required for a drive of the in-vehicle device 10.

Also, such the power generation at the high power generation cost is required when it is not possible to expect power generation at low power generation cost using regenerative energy, as in the case where an own vehicle travels in a substantially constant high-speed.

Hereinafter, a flow chart in FIG. 13 is used to explain the drive process of the alternator 6 accompanied by a change of the power generation voltage according to a travelling state of a vehicle.

First, at step 301 the travelling state determining unit 22 confirms whether or not an own vehicle is travelling in a substantially constant high-speed (whether or not the vehicle is travelling in the high-speed constant speed).

Here, whether or not the vehicle is travelling in the high-speed constant speed is determined by comparing a vehicle speed at the present point with a threshold for determining the high-speed travelling. The vehicle speed is identified from an output signal of the vehicle speed sensor 14.

For example, in a case where the vehicle speed is equal to or more than 80 km/h, it is determined that the vehicle is travelling in the high speed.

Incidentally in the present embodiment, in a case where the vehicle speed is less than 80 km/h and equal to or more than 20 km/h, it is determined that the vehicle is travelling in the medium speed, and in a case where the vehicle speed is less than 20 km/h, it is determined that the vehicle is travelling in the low speed.

In addition, whether or not the vehicle is travelling in the substantially constant high-speed is determined based upon whether or not acceleration identified from an output signal of the vehicle speed sensor 14 is within a threshold range for determining whether or not a vehicle travels in a substantially constant speed (travels in a constant speed). For examples in a case where the acceleration is within a range of ±0.5 G, it is determined that the vehicle is travelling in a constant speed.

When its own vehicle is determined to be in the travelling in the high-speed constant speed (Yes at step 301), at step 302 an output voltage setting unit 23 confirms whether or not the SOC at the present point is within the power generation range.

Also in the third embodiment, the drive permission upper limit line Cb is used for determination of a drive/stop of the alternator 6 (refer to FIG. 11).

When the vehicle is travelling in the substantially constant high-speed, the SOC of the battery 9 decreases with time by the power consumption of the in-vehicle device. In this case, the SOC at the present point is determined to be within the power generation region in a point where this SOC crosses the drive permission upper limit line Cb from a discharge region side to a power generation region side (refer to a change from position P5 to position P6 in FIG. 11).

Accordingly in a case where the SOC at the present point is not within the power generation region (No at step 302), the processes at step 301 and at step 302 are repeatedly executed while its own vehicle continues to travel in the high-speed constant speed.

In addition, SOC is decreased by the continuation of the high-speed constant speed travel to cross the drive, permission upper limit line Cb to the power generation region side, it is determined that the SOC is within the power generation region (Yes at step 302), and the process transfers to step 303.

At step 303 the output voltage setting unit 23 confirms whether or not the SOC at the present point is larger than a charge start threshold SOCc for determining whether or not it is an SOC necessary for starting the charging to the battery 9.

In addition, in a case where the SOC at the present point is larger than the charge start threshold SOCc (Yes at step 303) at step 304 the output voltage setting unit 23 sets the power generation voltage of the alternator 6 to a voltage (12V) lower than a normal voltage (15V) necessary for the charging to the battery 9 and starts the power generation in the set low voltage (12V).

Although the charging to the battery 9 cannot be made by this low voltage (12V), this voltage is a voltage by which the in-vehicle device 10 can be driven and corresponds to an output voltage of the battery 9. Thereby, it is possible to suppress a decrease in the SOC of the battery 9 while the alternator 6 generates power of 12V.

That is, the battery 9 is not charged by the power generation in the high power generation cost, but the output voltage of the alternator 6 is decreased to the output voltage of the battery 9 necessary for a drive of the in-vehicle device 10, thereby suppressing the power generation quantity in the high power generation cost.

In the present embodiment, at the time of setting the power generation voltage of the alternator 6 to the voltage (12V) lower than the normal voltage (15V), the output voltage setting unit 23 sets a target value (target SOC) of the SOC (charging rate) in the battery 9 to the above-mentioned charge start threshold SOCc.

Here, the charge start threshold SOCc is a minimum value of values that the target SOC of the battery 9 can have, and as described before, when the SOC becomes less than the charge start threshold SOCc, the charging to the battery 9 starts.

Therefore since the target SOC of the battery 9 is set to the charge start threshold SOCc as the minimum value of the possible values, the power generated by the alternator 6 is not used for the charging to the battery 9, but is used for the drive of the in-vehicle device.

At step 305 the travelling state determining unit 22 confirms whether or not a condition for getting the output voltage of the alternator 6 back to the normal voltage (15V) is established.

Specifically whether or not the power generation cost at the present point becomes smaller than a threshold (voltage recovery threshold: refer to FIG. 12) permitting the power generation in the normal output voltage is confirmed.

In a case where the condition for getting the output voltage of the alternator 6 back to the normal voltage is established (Yes at step 305), at step 306 the output voltage setting unit 23 changes the output voltage of the alternator 6 from the low voltage (12V) at the present point to the normal voltage (15V) by which the battery 9 can be charged.

Thereby fixation of the target value of the SOC of the battery 9 to the lower limit value is released, and the battery 9 is charged by the power generated in the lower power generation cost. Therefore hereinafter the SOC of the battery 9 is increased.

On the other hand, in a case where the condition for getting the output voltage of the alternator 6 back to the normal voltage is not established (No at step 305), since a travelling state of its own vehicle is in a state where the power generation cost is still high, the process returns to step 301.

As a result, for a period from a point where the power generation cost is decreased to a point where the condition for getting the output voltage of the alternator 6 back to the normal voltage is established, the output voltage of the alternator 6 is held to a voltage (12V) lower than the normal voltage (15V), and the alternator 6 continues, to generate power corresponding to a voltage quantity necessary for a drive of the in-vehicle device.

It should be noted that when the power consumption increases by an increase in number of driving in-vehicle devices or the like while the output voltage of the alternator 6 is held to the low voltage (12V), there are some cases where the power generation by the alternator 6 cannot cover the power to be used in the in-vehicle devices.

In this case, the SOC of the battery 9 is decreased with time (refer to a change from position P5 to position P8 in FIG. 12).

Then, in a point where the SOC crosses a threshold (charge start threshold SOCc) for determining a charge start to the battery 9 to a side lower in the SOC, the determination at above-mentioned step 303 is denied.

Therefore at step 306 the output voltage setting unit 23 changes the output voltage of the alternator 6 from the low voltage (12V) at the present point to the normal voltage (15V) by which the battery 9 can be charged.

Accordingly since the charging to the battery 9 is started to increase the SOC of the battery 9, the SOC is controlled not to exceed a threshold SOC_min and decrease therefrom for preventing the battery 9 from being oven-discharges.

In addition, when the power generation cost is decreased by a decrease in a vehicle speed or the like while the output voltage of the alternator 6 is suppressed to the low voltage (12V), a region where the SOC of the battery 9 is positioned is changed to a side of the medium-speed travelling region (refer to a change from position P6 to position P7 in FIG. 12).

As a result, in a point where the SOC becomes smaller than the threshold (voltage recovery threshold) permitting the power generation in the normal output voltage (15V), the condition for getting the output voltage of the alternator 6 back to the normal voltage is established (Yes at step 305).

Thereby since the output voltage of the alternator 6 is changed from the low voltage (12V) at the present point to the normal voltage (15V) by which the battery 9 can be charged, the power generated in the power generation cost lower than at the high-speed constant speed travelling is used for changing the battery 9.

As described above, according to the third embodiment, (17) the control unit 2 (power generation control device) configured to control the alternator 6 (power generator) that generates power by a driving force of the engine 3 to charge the battery 9 comprises:

the drive permission determining unit 20 (determining means) configured to determine a drive/stop of the alternator based upon an engine efficiency and an SOC of the battery;

the travelling state determining unit 22 (travelling state determining means) configured to determine a travelling state of a vehicle; and the output voltage setting unit 23 (output voltage setting means) configured to set an output voltage of the alternator 6 to a first voltage (15V) chargeable to the battery 9 or a second voltage (12V) that is an output voltage of the battery 9.

the output voltage setting unit 23 sets the output voltage of the alternator 6 to the second voltage (12V) in a case where the travelling state determining unit 22 determines that the vehicle is travelling in the high speed and the drive permission determining unit 20 determines the drive of the alternator 6.

When the vehicle is travelling in the high speed, the power generation by the alternator 6 is the power generation in the high power generation cost. When the vehicle is travelling in the high speed, since the regeneration by the deceleration is expected to be performed thereafter, it is not necessary to generate the power in the high power generation cost to charge the battery 9.

Therefore with the above configuration, when the output voltage of the alternator 6 is made to the second voltage (12V) that is the output voltage of the battery 9, it is possible to supply at least the power corresponding to the quantity to be consumed in the in-vehicle device driven with the output voltage of the battery 9.

Accordingly it is possible to suppress the power generation quantity in the high power generation cost while avoiding the battery 9 from being over-discharged.

(18) At the time of setting the output voltage of the alternator 5 to the second voltage (12V), the target SOC of the battery 9 is set to the lower limit value of the SOC.

With this configuration, since the power generated by the alternator 6 is not used to charge the battery 9 but can be used for the drive of the in-vehicle device 10, the power generation quantity in the alternator 6 is suppressed to the minimum, making it possible to certainly suppress the power generation quantity in the high power generation cost.

(19) The output voltage setting unit 23 is configured such that the output voltage of the alternator 6 is set to the second voltage (12V), and thereafter, in a case where the travelling-state determining unit 22 determines that the vehicle is not travelling in the high speed, the output voltage of the alternator 6 is set to the first voltage (15V).

The power generation cost is the higher as the travelling speed of the vehicle is the higher, and is the lower as the travelling speed is the lower.

Accordingly with the above configuration, the power generation cost is lowered by the decrease in the travelling speed of the vehicle, and thereafter, the generated voltage of the alternator 6 is back to the first voltage (15V) to start the charging to the battery 9. Therefore the battery 9 can be charged by the lower power generation cost.

(20) The drive permission determining unit 20 is configured such that in a case where the vehicle is during deceleration, when the SOC of the battery 9 is equal to or less than the maximum upper limit value SOCm for avoiding the over-discharge of the battery 9, the drive of the alternator 6 is permitted to implement the power generation by the alternator 6; and in a case where the vehicle is not during deceleration, by referring to the drive permission zone map defined by the drive permission upper limit line C in which the SOC is the lower as the power generation cost is the higher from the predetermined value α, only when the SOC of the battery 9 is within the drive permission zone in the drive permission zone map, the drive of the alternator 6 is permitted to implement the power generation by the alternator 6.

With this configuration, in a state where the SOC of the battery 9 is outside of the drive permission zone, the power generation cost is large and the fuel consumption is large, the drive of the alternator 6 is not performed until the SOC is lowered.

That is, the alternator 6 is not driven only when the SOC is quite low and having no other choice than the charge of the battery regardless of deterioration of the fuel consumption.

Thereby, consumption of the engine output is remarkably decreased in contrast to the conventional example where the alternator is driven without reference, to the engine efficiency. Thus, the fuel consumption performance is improved.

Fourth Embodiment Relating to a Drive Control of the Alternator 6

Hereinafter, an explanation will be made of a fourth embodiment relating to a drive control of the alternator 6.

Figure 14:
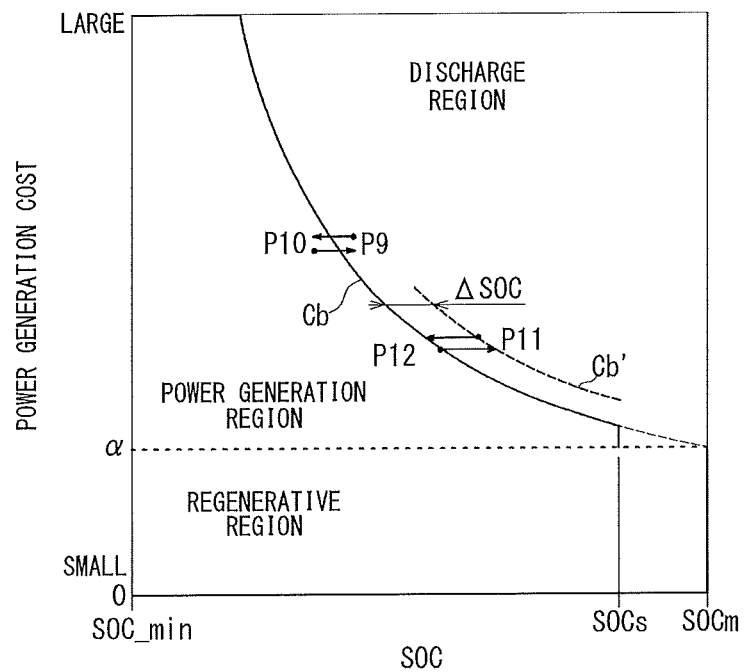
FIG. 14 is a graph explaining a drive/stop control of the alternator using the drive permission zone map.

FIG. 14 is a graph explaining a drive/stop control of the alternator 6 using a drive permission zone map, and a graph explaining a case of performing the drive/stop control of the alternator 6 using one drive permission upper limit line Cb and a case of separately preparing a determination line for stop, of the alternator 6.

Figure 15:
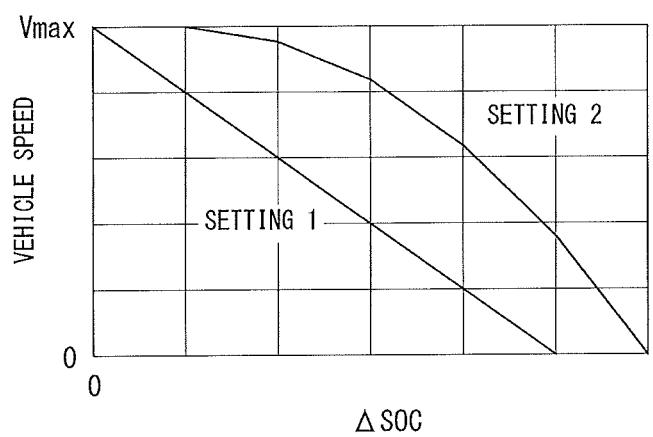
FIG. 15 is a graph explaining a relation between a vehicle, speed and a change quantity of the SOC.

FIG. 15 is a graph explaining a relation between a vehicle speed and a change quantity ΔSOC of an SOC (charging rate).

In the above other embodiment, a case of determining the drive/stop of the alternator 6 by using one drive permission upper limit line C is described as an example.

In the fourth embodiment, a drive determination line for determining the drive of the alternator and a stop determination line (drive permission upper limit line) for determining the stop of the alternator are prepared. Then, The control of power generation/power generation stop by the drive/stop of the alternator 6 is performed while switching these two determination lines.

In addition, hysteresis is provided between the drive determination line and the stop determination line, and the hysteresis varies with a magnitude of the power generation cost.

Specifically as the power generation cost is the higher, the hysteresis is the smaller, and as the power generation cost is the smaller, the hysteresis is the larger. Thereby as the power generation cost is the higher, a time from a power generation start for the charging to the battery 9 to a power generation stop is the shorter.

Hereinafter, the fourth embodiment of the present invention will be specifically explained.

First, an explanation will be made of a case where by referring to the drive permission zone map illustrated in FIG. 14, the drive/stop of the alternator 6 is implemented in response to the SOC (charging rate) of the battery 9 by using one drive permission upper limit line Cb.

When the power generation by the alternator 6 is not performed, as the SOC of the battery 9 is decreased by the consumption of the power in the in-vehicle device, the power generation by the alternator 6 is started in a point where the decreased SOC crosses the drive permission upper limit line Cb to a side lower in the SOC to start the charging to the battery 9 (refer to a change in an arrow direction from position P9 in FIG. 14).

Then, since the SOC increases following progress of the charging to the battery 9, the power generation by the alternator 6 terminates in a point where the increased SOC crosses the drive permission upper limit line Cb to a side higher in the SOC (refer to a change an arrow direction from position P10 in FIG. 14).

Therefore when the drive and the stop of the alternator 6 are determined using the same drive permission upper limit line Cb, there are some cases where there occurs chattering that the power generation and the stop by the alternator 6 are frequently repeated.

In the fourth embodiment, the above drive permission upper limit line Cb is used as the drive determination line for determining the power generation start by the alternator 6, and a stop determination line Cb' for determining the power generation termination by the alternator 6 is prepared separately from the above drive permission upper limit line Cb, wherein the two determination lines are switched to perform the drive/stop of the alternator 6.

Further, hysteresis (ΔSOC) is provided between the drive determination line Cb and the stop determination line Cb' to prevent the drive and the stop of the alternator 6 from being frequently repeated. Thus suppressing the chattering that the drive and the stop the alternator 6 are frequently repeated.

Here, as the travelling speed of the vehicle (vehicle speed) is the higher, the power generation cost of the alternator 6 the higher, and on the other hand, the power quantity to be generated by the regenerative energy at the subsequent deceleration increases.

Therefore as the vehicle speed is the higher, the power generation quantity generated by the subsequent regenerative energy can be expected. Therefore it is preferable to decrease the power generation quantity.

Here, in a case where the vehicle speed is the same, as the hysteresis between the drive determination line and the stop determination line is the larger, a change quantity (ΔSOC) of the SOC, from a start of the power generation by the drive of the alternator 6 to a termination of the power generation by the stop of the alternator 6, is the larger.

Therefore in the present embodiment, as the vehicle speed is the higher, the hysteresis between the drive determination line and the stop determination line is made the smaller.

Accordingly as the vehicle speed is the higher, the change quantity (ΔSOC) of the SOC from the start of the power generation by the drive of the alternator 6 to the termination of the power generation by the stop of the alternator 6 is the smaller to cause the charge at the time of the high power generation cost to be the smaller (refer to setting 1 and setting 2 in FIG. 15).

Further, in the present embodiment, hysteresis for each vehicle speed is determined using a relation between a vehicle speed and ΔSOC as illustrated in FIG. 15.

Here, as the vehicle speed is the higher, the power generation cost is the higher, and as the vehicle speed is the lower, the power generation cost is the lower. Therefore an increase and a decrease of the vehicle speed correspond substantially to an increase and a decrease of the power generation cost.

In the present embodiment, the hysteresis each vehicle, speed (power generation cost) is determined based upon setting 1. In this setting 1, ΔSOC is zero (=0) when the vehicle speed is an upper limit vehicle speed Vmax; and ΔSOC increases in a constant ratio as the vehicle speed becomes from the upper limit vehicle speed Vmax to a lowest vehicle speed (=0 km/h).

Figure 16:
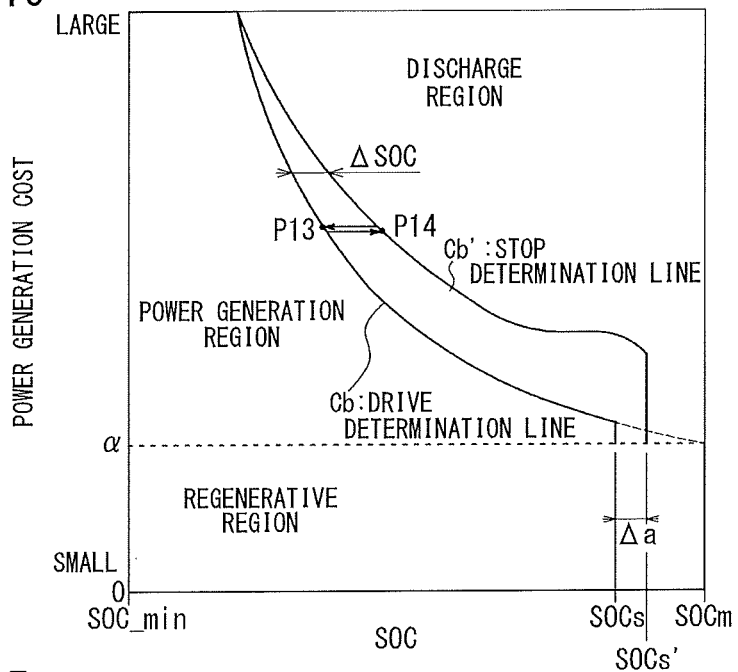
FIG. 16 is a graph explaining a drive permission zone map having two determination lines.

In addition, the stop determination line Cb' determined based upon this setting 1 becomes a stop determination line as illustrated FIG. 16.

Hereinafter, a flow chart in FIG. 18 and a drive permission zone map in FIG. 16 will be used to explain the drive process of the alternator 6 that performs the drive/stop of the alternator 6 using the two determination lines.

It should be noted that the stop determination line Cb' of the two determination lines (drive determination line Cb and stop determination line Cb') in the drive permission zone map in FIG. 16 is a stop determination line based upon setting 1 in FIG. 15. The stop determination line Cb' is set such that as the power generation cost is the higher, ΔSOC to the drive determination line is finally zero (=0).

The drive process using the two determination lines starts in a case where the power generation by the alternator 6 is being stopped (Yes at step 401) and the travelling state of an own vehicle is in an accelerating state or in a high-speed travelling state (Yes at step 402).

In this state, the SOC of the battery 9 decreases with time to require the power generation by the alternator 6. Therefore, at step 403 the drive permission determining unit 20 selects the drive determination line Cb as a determination line, for defining timing of the power generation start by the alternator 6.

At subsequent step 404 the drive permission determining unit 20 confirms whether or not the SOC is in the power generation region.

In a case where the SOC is not in the power generation region (No at step 404), at step 406 the drive permission determining unit 20 confirms whether or not an own vehicle is in the deceleration state.

In a case where its own vehicle is in the deceleration state (Yes at step 406), the drive process of the alternator 6 using the two determination lines ends. This is because this drive process is executed at the acceleration or at the high-speed travelling of its own vehicle.

On the other hand, in a case where the SOC is in the power generation region (Yes at step 404), at step 405 the drive permission determining unit 20 drives the alternator 6 to start the charging to the battery 9. Therefore the SOC of the battery 9 increases following the progress of the charging.

At subsequent step 407, the drive permission determining unit 20 selects the stop determination line Cb' as a determination line for defining timing of the power generation stop by the alternator 6.

Here, the stop determination line Cb' is positioned in a side higher in the SOC than the drive determination line Cb, and even in the same power generation cost, a difference (ΔSOC) in a value of the SOC therebetween exists.

Therefore, even when the SOC of the battery 9 starts to increase by the drive of the alternator 6, the stop of the alternator 6 is not determined immediately after the increase.

Specifically, as illustrated in FIG. 16, in a point where the reduced SOC reaches position P13 of intersecting with the drive determination line Cb, the alternator 6 is driven to start. In this case, since the stop determination line Cb' is offset by ΔSOC to the SOC side from the drive determination line Cb, the increased SOC is configured not to reach the stop determination line Cb' immediately after the alternator 6 is driven.

When at step 407 the stop determination line Cb' is selected, at subsequent step 408 the drive permission determining unit 20 confirms whether or not the SOC is in the discharge region.

This is because by the start of the power generation by the alternator 6 at step 405, the SOC increases with time to be closer to the stop determination line Cb'.

Accordingly at step 408 the SOC is determined to be not in the power generation region until the increased SOC reaches position P14 of intersecting with the stop determination line Cb' (No at step 408).

In addition, when its own vehicle becomes in the deceleration state by the time the increased SOC reaches position P14 of intersecting with the stop determination line Cb', determination at step 410 is positively made to terminate the drive process of the alternator 6 using the two determination lines. This is because this drive process is executed at the acceleration or at the high-speed travelling of its own vehicle.

On the other hand, in a state where the acceleration state or the high-speed travelling state of its own vehicle continues to be maintained (No at step 410), when the SOC of the battery 9 reaches position P14 where the SOC intersects with the stop determination line Cb' (Yes at step 408), at step 409 the drive permission determining unit 20 stops the drive of the alternator 6 to terminate the charging to the battery 9, and thereafter, the process returns to step 402. That is, in a state where its own vehicle does not become in the deceleration state, when the SOC of the battery 9 reaches position P14, the drive of the alternator is terminated.

Accordingly hereinafter, while the acceleration state or the high-speed travelling state of its own vehicle lasts, the control of the drive/stop of the alternator 6 is executed while switching the determination lines (the drive determination line Cb and the stop determination line Cb').

Here, as described before, the difference (ΔSOC) in SOC between the drive determination line Cb and the stop determination line Cb' is set to be the smaller as the power generation cost is the higher and is set to be the larger as the power generation cost is the lower.

Accordingly as the power generation cost is the higher, a period from the start of the power generation by the drive of the alternator 6 to the stop of the power generation by the stop of the alternator 6 is the shorter. Therefore the charging of the power generated in the high power generation cost to the battery 9 is suppressed.

It should be noted that in the drive permission zone map in FIG. 16, a difference Δα between a power generation stop threshold SOCs in the drive determination line Cb and a power generation stop threshold SOCc' in the stop determination line Cb' is set to a minimum value enabling avoiding occurrence of chattering. This is because of ensuring a region (regeneration reception region) for receiving the power generated by using the regenerative energy.

[Modification]

In the fourth embodiment as described before, there is exemplified a case of determining the stop of the alternator 6 by using the stop determination line Cb' produced based upon setting 1 in FIG. 15.

That is, there is exemplified a case of determining the hysteresis in each vehicle speed (power generation cost) based upon setting 1. In this setting 1, ΔSOC is zero (=0) when the vehicle speed is the upper limit vehicle speed Vmax on the setting and ΔSOC increases in a constant ratio as the vehicle speed changes from the upper limit vehicle speed Vmax on the setting to the lowest vehicle speed (=0 hm/h).

The stop determination line, instead of setting 1, may determine hysteresis in each vehicle speed (power generation cost) based upon setting 2. In this setting 2, ΔSOC is a minimum value when the vehicle speed is the upper limit vehicle speed Vmax on the setting, and although ΔSOC increases as the vehicle speed changes from the upper limit vehicle speed Vmax on the setting to the lowest vehicle speed (=0 km/h), the increasing quantity does not change in a constant ratio (changes in geometric progression).

Figure 17:
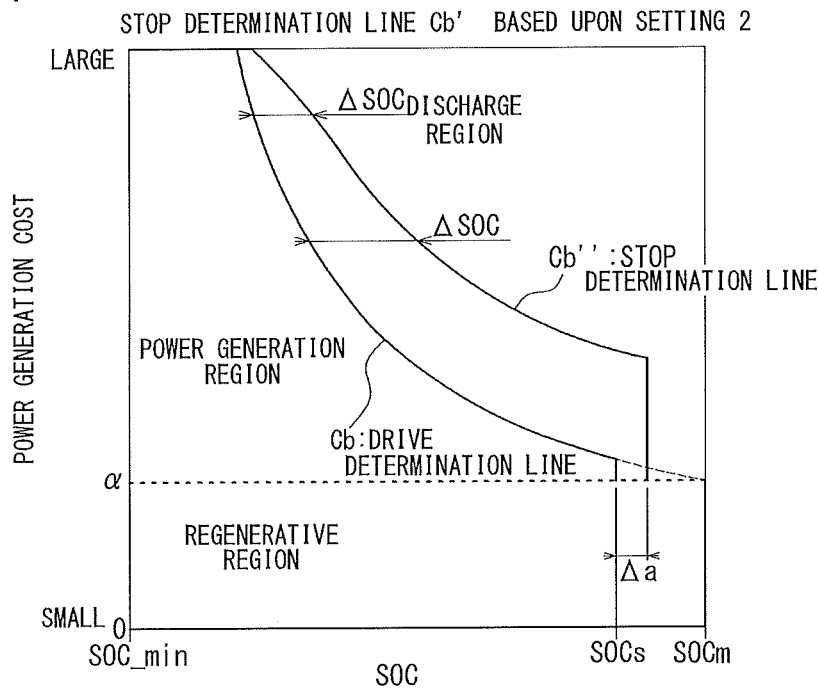
FIG. 17 is a graph explaining the drive permission zone having the two determination lines.

That is, the stop of the alternator 6 may be determined using the stop determination line Cb' (FIG. 17) produced based upon this setting 2.

As described above, according to the fourth embodiment, (21) the control unit 2 (power generation control device) configured to control the alternator 6 (power generator) that generates power by the driving force of the engine 3 to charge the battery 9 comprises:

the drive permission determining unit 20 (determining means) configured to determine a drive/stop of the alternator 6 based upon an engine efficiency and an SOC of the battery;

the drive permission determining unit 20 determines the drive of the alternator 6 when the SOC is smaller than a threshold SOC for drive for determining the drive of the alternator 6; the drive permission determining unit 20 determines the stop of the alternator 6 when the SOC is larger than a threshold SOC for stop for determining the stop of the alternator 6; and the threshold SOC for stop is the higher than the threshold SOC for drive as the engine efficiency is the higher and the power generation cost is the lower.

With this configuration, as the engine efficiency is the higher and the power generation cost is the lower, an interval between a drive, and a stop of the alternator 6 is the longer to increase, the power generation quantity. On the other hand, as the engine efficiency is the lower and the power generation cost is the higher, the interval between the drive and the stop of the alternator 6 is the shorter to decrease the power generation quantity.

Accordingly the power generation by the drive of the alternator 6 is suppressed when the engine efficiency is low. On the other hand, it is possible to long perform the power generation by the drive of the alternator 6 when the engine efficiency is high.

Thereby since it is possible to decrease loads to the engine when the engine efficiency is low, an improvement on the fuel consumption performance can be expected.

In addition, since it is possible to preferably suppress occurrence of chattering that the power generation by the drive of the alternator 6 and the power generation stop by the stop of the alternator 6 are alternately repeated for a short time, a passenger in a vehicle can be prevented from being uncomfortable due to the occurrence of the chattering.

(22) The threshold SOC for stop is made larger than the threshold SOC for drive.

With this configuration, the battery 9 can be appropriately charged by the power generated in the alternator 6.

(23) The determination for the drive/stop of the alternator is made by comparison between the SOC and the threshold SOC for drive or the threshold SOC for stop.

The determination for the drive/stop of the alternator is made at the acceleration of a vehicle or at the constant-speed high speed travelling in a predetermined speed or more of a vehicle.

When the chattering that the alternator 6 alternately repeats the drive and the stop occurs at the acceleration of a vehicle car at the constant-speed high speed travelling of a vehicle in a predetermined speed or more, the driving force of the vehicle increases/decreases in association with the drive and the stop of the alternator. In this case, a driver of the vehicle possibly has an uncomfortable feeling to drive characteristics of the vehicle.

By adopting the above-described configuration, the occurrence of the chattering can be suppressed. Thus, it is possible to preferably prevent the driver of the vehicle from having the uncomfortable feeling to the drive characteristics of the vehicle.

(24) The difference between the threshold SOC for drive (drive determination line Cb) and the threshold SOC for stop (stop determination line Cb') is set to be the smaller as the vehicle, speed of the engine vehicle is the higher.

With this configuration, as the vehicle speed of the vehicle is the higher to increase the power generation cost, the time from the power generation start for the charging to the battery 9 to the power generation stop is the shorter. Thereby, it is possible to suppress the power generation time in the high power generation cost.

In the present specification, the drive control of the alternator 6 is explained by the plurality of embodiments and the modification individually, but the present invention can be realized by optionally combining each of the above embodiments with the modification.

DESCRIPTION OF REFERENCE SIGNS

1 Engine control device (power source manages system)
2 Control unit
3 Engine 4 Transmission
5 Wheel
6 Alternator
7 Starter motor
9 Battery
9a Battery sensor
10 In vehicle device
11 Start button
12 Rotation sensor
13 Accelerator sensor
14 Vehicle speed sensor
15 Brake switch
16 Navigation device
17 GPS receiver
20 Drive permission determining unit
21 Power generation stop threshold setting unit
22 Travelling state determining unit
23 Output voltage setting unit
25 ROM
26 RAM
C (Ca, Cb, Cc) Drive permission upper limit line
Cb', Cb" Stop determination line
Cb Drive determination line
HEV Micro
M1 Power generation cost map
M2 Drive permission zone map
SOCs, SOCs' Power generation stop threshold
SOCc Charge start threshold
SOCm Maximum upper limit value
WGI Wasteful power generation index
Z Drive permission zone

What is claimed is:

1. A method for controlling a drive of an alternator in a vehicle equipped with an engine that charges a battery by power generated by the alternator, comprising:
  driving the alternator if an SOC of the battery is less than or equal to a maximum limit value of the SOC to avoid overcharging the battery when the vehicle is decelerating; and
  when the vehicle is not decelerating, driving the alternator based upon:
    a drive permission zone map that includes a drive permission upper limit that defines an upper limit of a threshold of the SOC, and
    an engine efficiency calculated by an engine rotational speed and a torque output from the engine and the SOC of the battery being within a first area of the drive permission zone map,
    wherein first area is where the engine efficiency is high and the SOC is low, and the second area is where the engine efficiency is low and the SOC is high,
    when the SOC of the battery is less than a threshold determined by the engine efficiency.

2. The method for controlling the drive of the alternator according to claim 1, wherein when the vehicle is decelerating, the alternator is driven until the SOC of the battery reaches a charge limit value.

3. The method for controlling the drive of the alternator according to claim 1,
  wherein when the vehicle is not decelerating, as power consumption of a battery load increases, the alternator is driven further based upon the power consumption of a battery load,
  the upper limit of the threshold of the SOC changes in accordance with the power consumption, and the upper limit when the power consumption is high is greater than the upper limit when the power consumption is low.

4. The method for controlling the drive of the alternator according to claim 1, the method further comprising:
  when the vehicle is not decelerating, stopping the alternator when the SOC of the battery is greater than the threshold,
  wherein the threshold when the SOC of the battery is high is greater than the threshold when the SOC of the battery is low.

5. The method for controlling the drive of the alternator according to claim 1,
  wherein, when the vehicle is not decelerating, the drive of the alternator is permitted when the SOC of the battery is less than or equal to the upper limit of the threshold for permitting the drive of the alternator, and the drive of the alternator is not permitted when the SOC of the battery is greater than the upper limit, and
  the upper limit of the threshold for permitting the drive of the alternator is determined by the engine efficiency.

6. The method for controlling the drive of the alternator according to claim 5, wherein the SOC in the drive permission upper limit line when the engine efficiency is the determined value, corresponds to the maximum upper limit value.

7. The method for controlling the drive of the alternator according to claim 5, wherein in the drive permission zone map, a plurality of the drive permission upper limit lines is set corresponding to power consumption of a battery load.

8. The method for controlling the drive of the alternator according to claim 6, wherein in the drive permission zone map, a plurality of drive permission upper limit lines is set corresponding to power consumption of a battery load.

9. The method for controlling the drive of the alternator according to claim 5,
  wherein the engine efficiency is a power generation cost of the alternator, and
  an increase in the power generation cost corresponds to a decrease in the engine efficiency.

10. The method for controlling the drive of the alternator according to claim 6,
  wherein the engine efficiency is a power generation cost of the alternator, and
  an increase in the power generation cost corresponds to a decrease in the engine efficiency.

11. The method for controlling the drive of the alternator according to claim 5,
  wherein the drive permission upper limit line is set using the threshold, and
  the threshold is one threshold set on one index obtained by multiplying the engine efficiency by the SOC of the battery.

12. The method for controlling the drive of the alternator according to claim 11, wherein the one threshold set on the one index is set in response to a prediction of increase or decrease of the SOC.

13. The method for controlling the drive of the alternator according to claim 12, wherein a the one threshold represented as WGI_TH is calculated according to following formula (1):

$$WGI\_TH = ((1/\eta_{alternator}) \times Willans_{factor}) \times X \quad (1),$$

wherein, $(1/\eta_{alternator}) \times Willans_{factor}$ is a power generation cost, $\eta_{alternator}$ is an alternator efficiency, $Willans_{factor}$ is a gasoline-power conversion efficiency, and X is the SOC of the battery.

* * * * *